US006338436B1

(12) United States Patent
Iguchi et al.

(10) Patent No.: US 6,338,436 B1
(45) Date of Patent: *Jan. 15, 2002

(54) VARIABLE TICKET AND TICKET PRINTER

(75) Inventors: Koji Iguchi; Chisato Hiyama; Kazuto Kitano; Koh Ezoe, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/422,770

(22) Filed: Apr. 14, 1995

Related U.S. Application Data

(63) Continuation of application No. 08/016,209, filed on Feb. 10, 1993, now abandoned.

(30) Foreign Application Priority Data

| | | |
|---|---|---|
| Feb. 13, 1992 | (JP) | 4-025613 |
| May 14, 1992 | (JP) | 4-121926 |
| May 14, 1992 | (JP) | 4-121927 |
| May 14, 1992 | (JP) | 4-121928 |
| Nov. 19, 1992 | (JP) | 4-309130 |

(51) Int. Cl.[7] .......... G06K 7/10; G06K 19/02

(52) U.S. Cl. .......... 235/488; 360/2; 235/456

(58) Field of Search .......... 235/449, 493, 235/488, 384, 382, 375; 360/2, 8, 32, 46

(56) References Cited

U.S. PATENT DOCUMENTS

| | | | | | |
|---|---|---|---|---|---|
| 3,673,905 | A | * | 7/1972 | Kono | 83/175 |
| 3,730,411 | A | * | 5/1973 | Brockmuller | 83/175 X |
| 3,902,954 | A | * | 9/1975 | Lotto | 83/175 X |
| 4,637,286 | A | * | 1/1987 | Boggs | 83/175 |
| 4,670,636 | A | * | 6/1987 | Taub et al. | 83/175 X |
| 4,691,605 | A | * | 9/1987 | Vanetik et al. | 83/175 |
| 4,833,488 | A | * | 5/1989 | Mizutami et al. | 346/46 X |
| 4,895,466 | A | | 1/1990 | Hartman et al. | |
| 4,928,133 | A | * | 5/1990 | Fulton | 346/150 |
| 4,997,119 | A | * | 3/1991 | Meschi | 225/100 |
| 5,113,062 | A | * | 5/1992 | Fujita et al. | 235/493 |
| 5,206,489 | A | * | 4/1993 | Warwick | 235/449 |
| 5,229,586 | A | * | 7/1993 | Ishii | 235/449 X |
| 5,268,561 | A | * | 12/1993 | Kimura et al. | 235/449 X |
| 5,309,176 | A | * | 5/1994 | Faes et al. | 346/76 |

FOREIGN PATENT DOCUMENTS

| | | | | |
|---|---|---|---|---|
| CA | 974164 | * | 9/1975 | 83/175 |
| DE | 2937312 | * | 3/1981 | 225/100 |
| EP | 0325516 | | 7/1989 | |
| EP | 0345 980 | | 12/1989 | |
| EP | 0345980 | | 12/1989 | |
| EP | WO/90 08944 | | 8/1990 | |
| EP | 0416795 | | 3/1991 | |
| EP | 0416795 A2 | | 3/1991 | |
| EP | 0556071 | | 9/1997 | |
| GB | 2 094 496 | | 9/1982 | |
| GB | 2094496 | | 9/1982 | |
| JP | 55-56949 | | 4/1980 | |
| WO | 9008944 | | 8/1990 | |

OTHER PUBLICATIONS

Japanese Publication *Paper Pulp Technical Times*, Apr. 1990, pp. 6–11.

* cited by examiner

*Primary Examiner*—Thien M. Le
(74) *Attorney, Agent, or Firm*—Staas & Halsey LLP

(57) ABSTRACT

A valuable ticket—on which ticketing data is magnetically recorded and which is printed for issuance-includes a base a heat-sensitive layer provided on one side of the base, a protective layer provided on the heat-sensitive layer and a magnetic recording layer provided on the other side of the base. A ticket printer for magnetically recording and printing ticketing data on ticket blanks for issuance includes ticket blank holder means for holding ticket blanks, each comprising a base, a heat-sensitive layer and a protective layer provided on one side of the base and a magnetic recording layer provided on the other side of the base, magnetic recording means for magnetically recording ticketing data the magnetic recording layers of the ticket blanks contained in the ticket blank holder means, and thermal printing means for thermally printing the ticketing data on the heat-sensitive layers of the magnetically recorded ticket blanks for issuance.

12 Claims, 29 Drawing Sheets

VARIABLE TICKET AND TICKET PRINTER

This application is a continuation of application Ser. No. 08/016,209, filed Feb. 10, 1993, now abandoned.

BACKGROUND OF THE INVENTION

1. Field of the Invention

The present invention relates generally to a valuable ticket and a ticket printer and, more particularly, to a valuable ticket in which ticketing data is magnetically recorded and printed and a ticket printer for issuing such a ticket by recording and printing ticketing data on it.

In airline and other industries, a reservation and ticketing system for airline or other tickets, called a computer reservation system or CRS for short, has been built up so as to deal with intensive passenger-conscious services. A problem of vital importance for such a system designed to accommodate to a recently increasing number of passengers is to make its services (for reservation and fare adjustment) efficient.

For that reason, the introduction of airline tickets provided with magnetic stripes so as to control these services in bulk, called automated ticket/boarding pass or ATB for short, is now spreading drastically. These tickets are required to have high storage stability of printed data and to have the ability to be printed easily as well. A ticket printer for them, on the other hand, is required to make ticket management easy and to render ticketing less time- and labor-consuming as well.

2. Description of the Related Art

Tickets issued from a conventional ticket printer have made use of plain paper and been printed on wire-dot, electrophotographic and other printing systems. The wire-dot printing system involves some grave problems such as (1) loud noise, (2) low print resolution and (3) slow printing speed, and the electrophotographic printing system has again some serious problems such as (1) an increase in hardware size, (2) a rise in hardware cost and (3) susceptibility to environmental changes (printing is difficult at high humidity in particular). In recent years, hardware working on a thermal-dot printing system making use of a heat transfer ink ribbon has been developed.

This thermal-dot printing system making use of a heat transfer ink ribbon makes no noise, has a high print resolution and a high printing speed, achieves reductions in hardware size and cost and dispenses with any maintenance, and so lends itself well to issuing airline tickets.

However, some serious problems with the conventional thermal-dot printing system making use of a heat transfer ink ribbon are that (1)the heat transfer ink ribbon costs much and incurs some considerable expense for maintenance, and (2) the heat transfer ink ribbon is troublesome to handle, because it must be replaced by new one whenever a certain number of prints are obtained.

Consequently, it is now desired to use printing hardware working on a direct thermal printing system—in which case heat-sensitive paper is directly printed—and making no use of any heat transfer ink ribbon. In the case of airline tickets that are a sort of securities, however, there are the following problems.

(1) Generally, the thermal-printing paper is a paper that is obtained by coating a heat-sensitive layer comprising a leucodye, a color developer and a binder onto a paper substrate at a thickness of a few $\mu$m. When heated by a thermal printing element, the leucodye and color developer are fused to give rise to a color-developing chemical reaction. However, this color-developing zone, when stored over an extended period, disappears, thus rendering the thermally printed paper invaluable.

(2) A printed thermal-printing paper, when coming into contact with an organic solvent such as alcohol, a plasticizer and oils and fats, breaks up the chemical reaction, causing the color-developing zone to disappear.

Conventional airline ticket printers have been broken down into two types, one in which a stock of precut ticket blanks are fed out one by one for magnetic recording and printing, and the other in which a stock of continuous paper blanks is magnetically recorded and printed.

The former airline ticket printer has an advantage in that the precut ticket blanks can be easily magnetically recorded and printed. These tickets are a sort of high-priced securities, and so there is a need of managing the blanks therefor. However, not only is it difficult to manage such separate ticket blanks, but they are also likely to be missing by wrongdoing or in error. In addition, much difficulty is encountered in finding them, when missing.

The latter airline ticket printer has an advantage in that the continuous ticket blank can conveniently be managed, because whether or not something wrong is occurring can be easily determined by finding the presence of cutouts. However, it is difficult to make magnetic records and prints on a continuous form of ticket blank, and this form of ticket blank costs much time and labor, because it is required for an operator to separate it into individual tickets and hand them to passengers.

SUMMARY OF THE INVENTION

An object of the invention is to provide a valuable form of ticket which, even when printed on a direct thermal printing system, does not erase what is printed.

Another object of the invention is to provide a ticket printer for issuing a valuable form of ticket which, even when printed on a direct thermal printing system, does not erase what is printed.

A further object of the invention is to provide a ticket printer which enables ticket blanks to be easily managed and which is capable of issuing a valuable form of tickets in a separate form.

A still further object of the invention is to provide a ticket printer which is so compact in size that it can be located between desks.

A valuable form of ticket according to the invention enables ticketing data to be magnetically recorded and printed, and includes a base, a heat-sensitive layer applied on one side of the base, a protective layer applied on the heat-sensitive layer and a magnetic recording layer applied on the other side of the base.

Because the protective layer is applied on the heat-sensitive layer, the valuable form of ticket according to the invention can be protected against coming into contact with a solvent, a plasticizer, and so on. Besides, the ticket of the invention can be used in the form of a security, because the color-developing zone is by no means erased, even when formed on a simple direct thermal printing system, and so is high in terms of storage stability.

Because the magnetic recording layer is applied on the side of the base that is opposite to the side thereof on which the heat-sensitive layer is formed and so the heat-sensitive layer is all available in the form of the side to be printed, it is possible to make effective use of the ticket that has a limited area. With the ticket according to the invention wherein the magnetic recording layer is not affected by the heat of a thermal recording element and so the data magnetically recorded there is invariable, it is possible to make sufficient prints and record the magnetic data certainty.

A ticket printer according to the invention comprises a stock holder unit for holding ticket blanks, each including a heat-sensitive layer and a protective layer on one side of a base and a magnetic recording layer on the other side of the base, a thermal printer unit for thermally printing the heat-sensitive layer of each ticket blank fed out of the stock holder unit and a magnetic recorder unit for magnetically recording data on the magnetic recording layer of the ticket blank.

According to this ticket printer, it is possible to issue valuable tickets having high storage stability, because they can be protected against coming into contact with solvents, plasticizers, etc., due to the provision of the protective layer on the heat-sensitive layer, and because their color-developing zones are by no means erased, even when formed by the thermal printer unit that makes use of a simple direct thermal recording system.

Another ticket printer of the invention is designed to print and magnetically record ticketing data on a ticket blank and thereby issue a valuable ticket, and comprises a ticket blank holder for containing a continuous form of medium that is separated along perforations into individual ticket blanks, a pre-feeder unit for feeding the continuous form of medium from the ticket blank holder and cutting and separating the medium into individual ticket blanks, a magnetic recorder unit for magnetically recording ticketing data on a magnetic recording layer of each ticket blank cut by and fed from the pre-feeder unit, and a printer unit for printing ticketing information on the magnetically recorded ticket blank.

This ticket printer makes magnetic recording and printing easy and dispenses with separating tickets after issuance, because, even when a continuous form of medium is used, it is cut through the pre-feeder unit into individual ticket blanks. And these individual ticket blanks are magnetically recorded and printed, and so the valuable ticket blanks can be easily controlled as a continuous form of medium and, besides, can be magnetically recorded and printed individually.

Other features and advantages of the present invention will be apparent from the following description taken in conjunction with the accompanying drawings.

DESCRIPTION OF THE PREFERRED EMBODIMENT

Figure 1A:
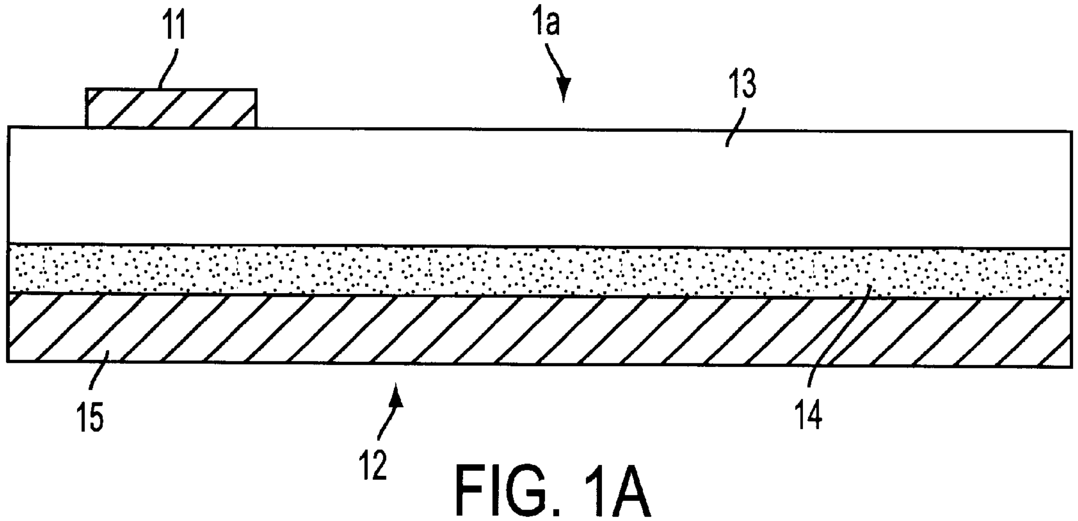
FIGS. 1(A) and (B) are sectional views of one example of the airline ticket according to the present invention.
Figure 1B:
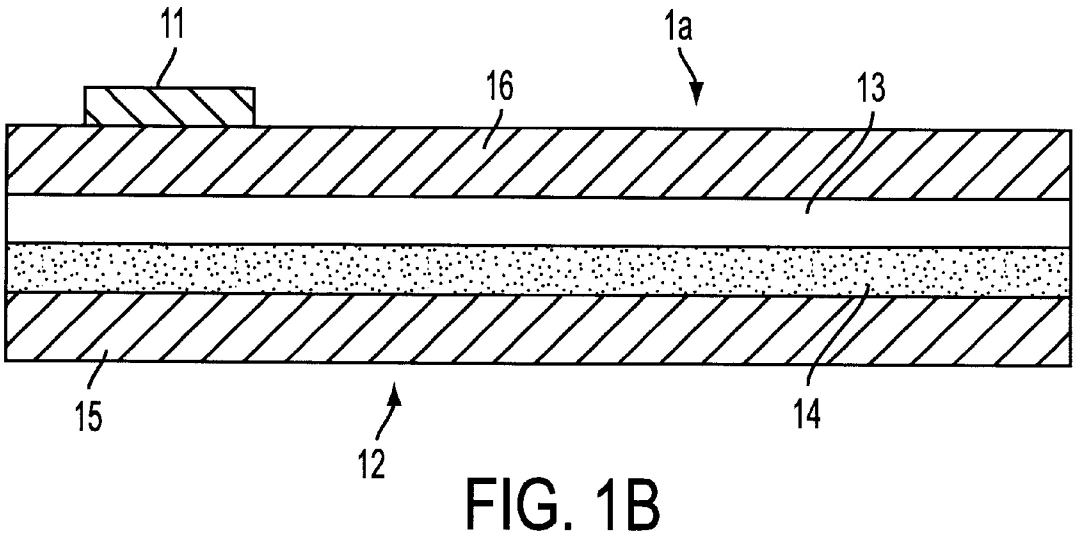
Figure 2:
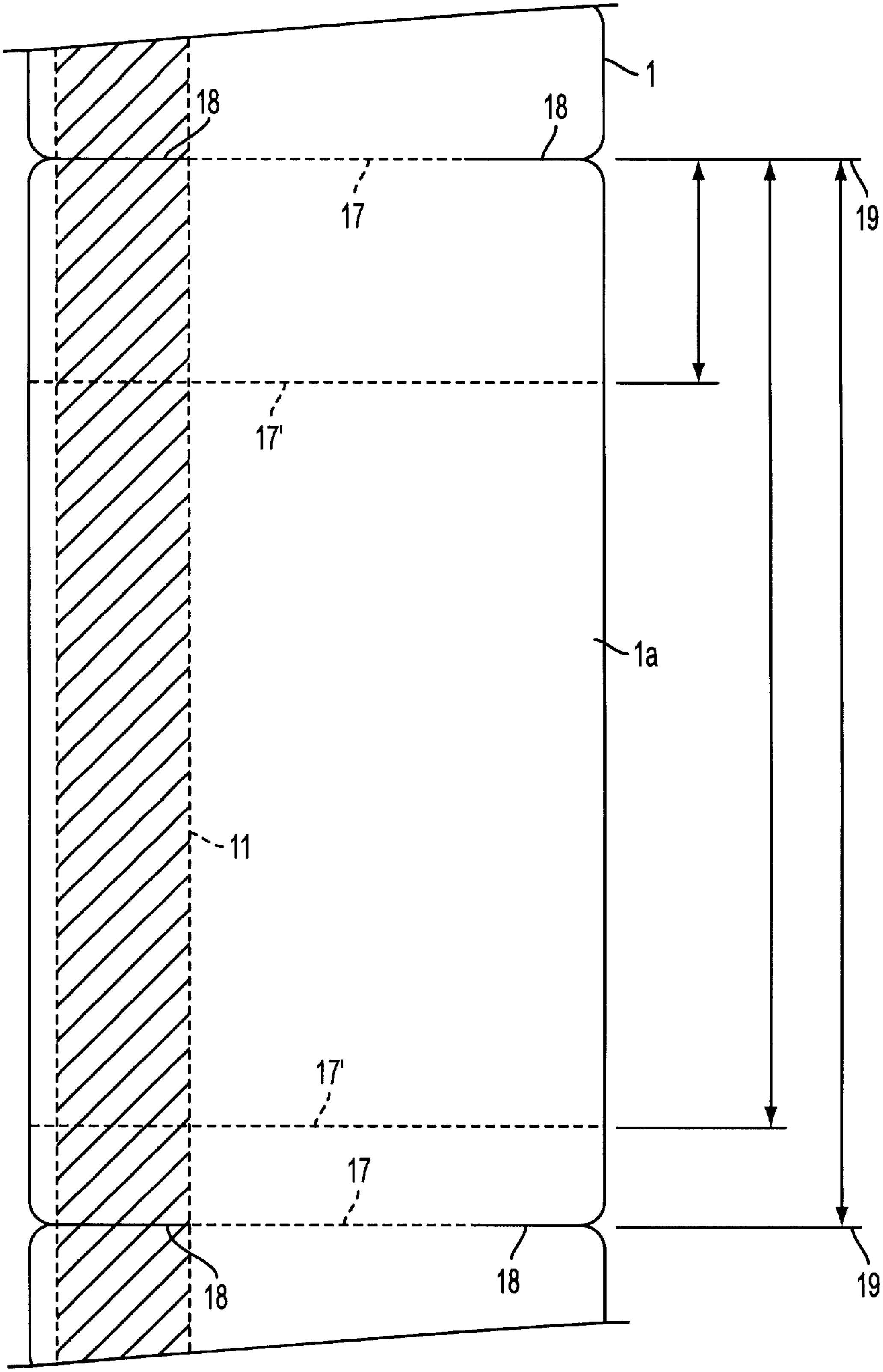
FIG. 2 is an upper view of the airline ticket of FIG. 1.
Figure 3:
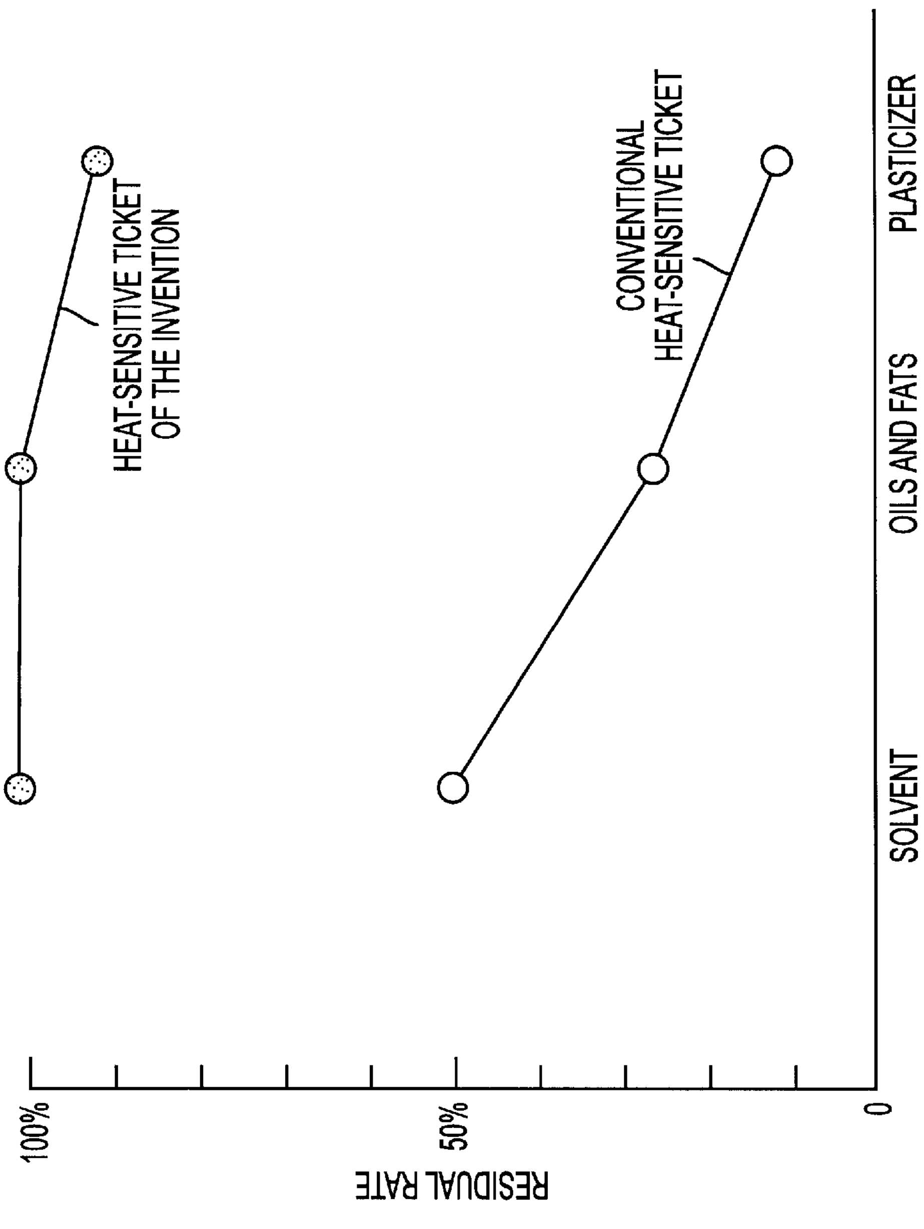
FIG. 3 is a characteristic graph that shows the storage stability of the airline ticket of FIG. 1.

Referring first to FIGS. 1–3, there is shown an airline ticket that is one embodiment of the invention.

As illustrated in FIG. 1(A), an airline ticket blank, shown generally by 1*a*, comprises a paper base 13 that is provided on its one (back) side with a heat-sensitive layer 14 having on its surface a protective layer 15 formed of water-soluble resin. On the opposite (front) inside of the paper base 13 there is provided a magnetic stripe 11. This heat-sensitive layer 14 is composed of an irreversible pigment, a developer and a binder.

Thus, the provision of the protective layer 15 on the surface of the heat-sensitive layer 14 can physically prevent a solvent such as alcohol, a plasticizer, and so on from entering the heat-sensitive layer 14. This in turn makes it possible to prevent a solvent such as alcohol, a plasticizer, and so on from coming into contact with the portion of the heat-sensitive layer 14 that develops color by chemical reactions, thereby breaking up such chemical reactions and so resulting in fade-out.

The irreversible pigment is used as the color-developing dye in the heat-sensitive layer 14, so that the ticket according to this embodiment can stand up to long-term storage and so is best suited as a reservation ticket.

The magnetic stripe 11 is provided on the side of the paper base 13 that is opposite to the side thereof, on which the heat-sensitive layer 14 is provided, so that the heat-sensitive layer 14 is available all over surface for printing, thus assuring good-enough printing. In addition, the magnetic stripe 11 is unlikely to receive printing heat directly and so the magnetically recorded data thereon is unlikely to change.

Another embodiment of the ticket shown in FIG. 1(B) follows the construction shown in FIG. 1(A) with the exception that an additional protective layer 16 is provided on the side of the paper base 13 with the magnetic stripe 11 formed on it. According to this embodiment, it is possible to prevent solvents, plasticizers, etc., from penetrating into the heat-sensitive layer 14 through the paper base 13, and so it is possible to further improve the storage stability of the ticket.

As illustrated in FIG. 2, this airline ticket blank 1*a* is in the form of continuous paper 1 that is provided with folds 19 perforated, as shown at 17, for its easy separation from equipment. Further, each perforation 17 is cut on both its sides, as shown at 18, for easier separation of each ticket blank. It is here noted that one ticket blank 1*a* is divided by a fold 19 from another, and provided with additional two perforations 17', so that a ticket collector can receive the stub when it is used.

As can be seen from FIG. 3 which is a storage stability diagram, a conventional heat-sensitive ticket having no protective layer 15 decreases in terms of the residual rate of the color-developing zone to 50% with respect to a solvent, 30% with respect to oils and fats and 10% with respect to a plasticizer, but the heat-sensitive ticket of the invention, shown in FIG. 1(A), is of good-enough storage stability, because the residual rate of the color-developing zone is nearly invariable, i.e., 100% with respect to a solvent, 100% with respect to oils and fats and 90% with respect to a plasticizer.

The airline ticket printer according to the invention will now be explained with reference to FIGS. 4, 5 and 6.

Figure 4:
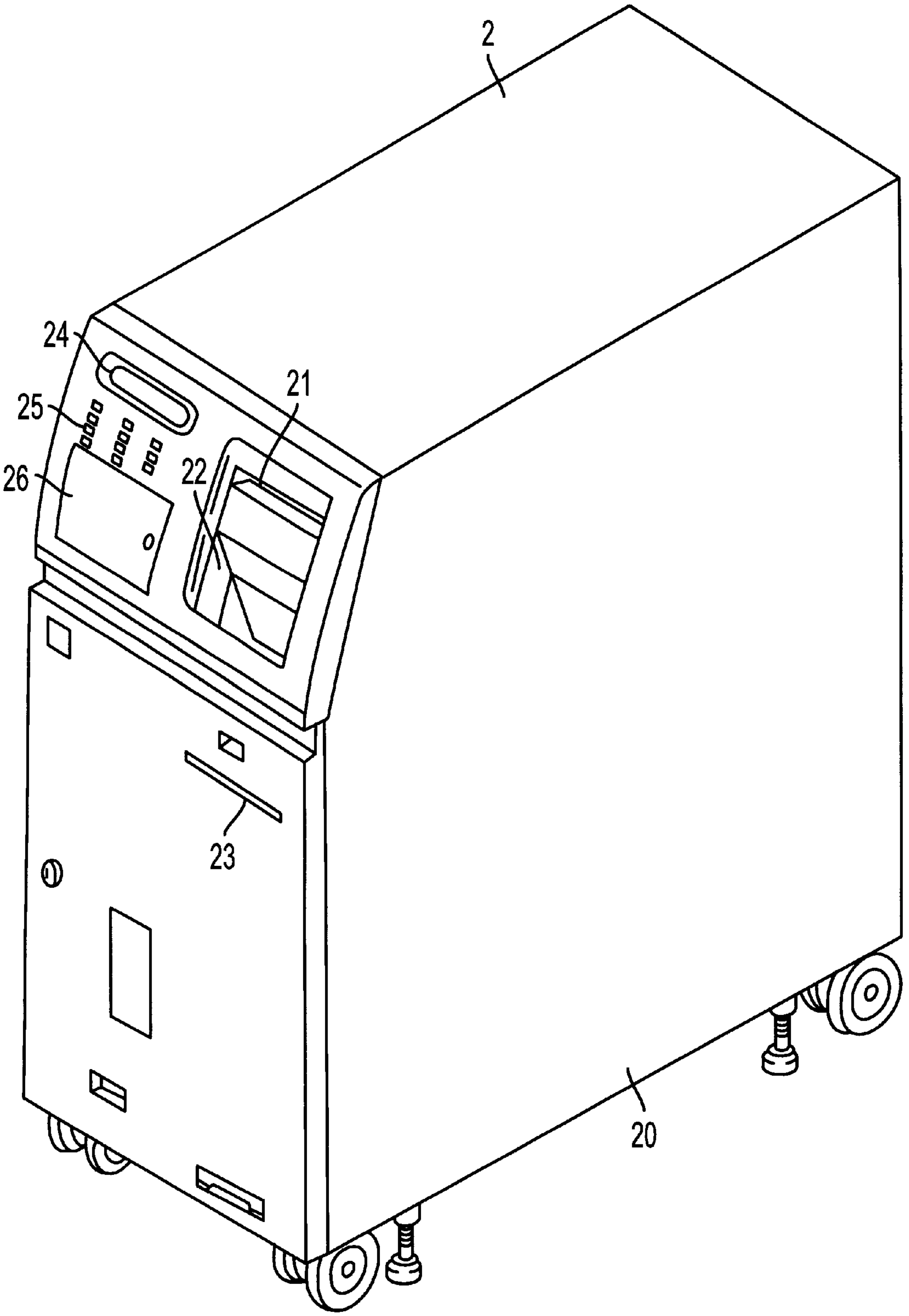
FIG. 4 is an illustration of the appearance of one embodiment of the airline ticket printer according to the invention.

Referring first to FIG. 4, there is perspectively shown an airline ticket printer shown generally as 2. This ticket printer is built up of a housing 20, an inlet port 21 through which an unrecorded, unprinted ticket blank is inserted for printing and magnetic recording, an internal stacker or hopper 22 for storing printed, magnetically recorded ticket blanks, and an ejection port 23 for ejecting the printed, magnetically recorded ticket blanks. Reference numeral 24 represents a display (e.g., a liquid-crystal display—LCD) for guidance and other purposes, 25 an indicator (e.g., a light-emitting diode—LED) for providing an indication of what state the ticket printer is in, and so on, and 26 a control panel that is covered and includes keys for various operations.

Figure 5:
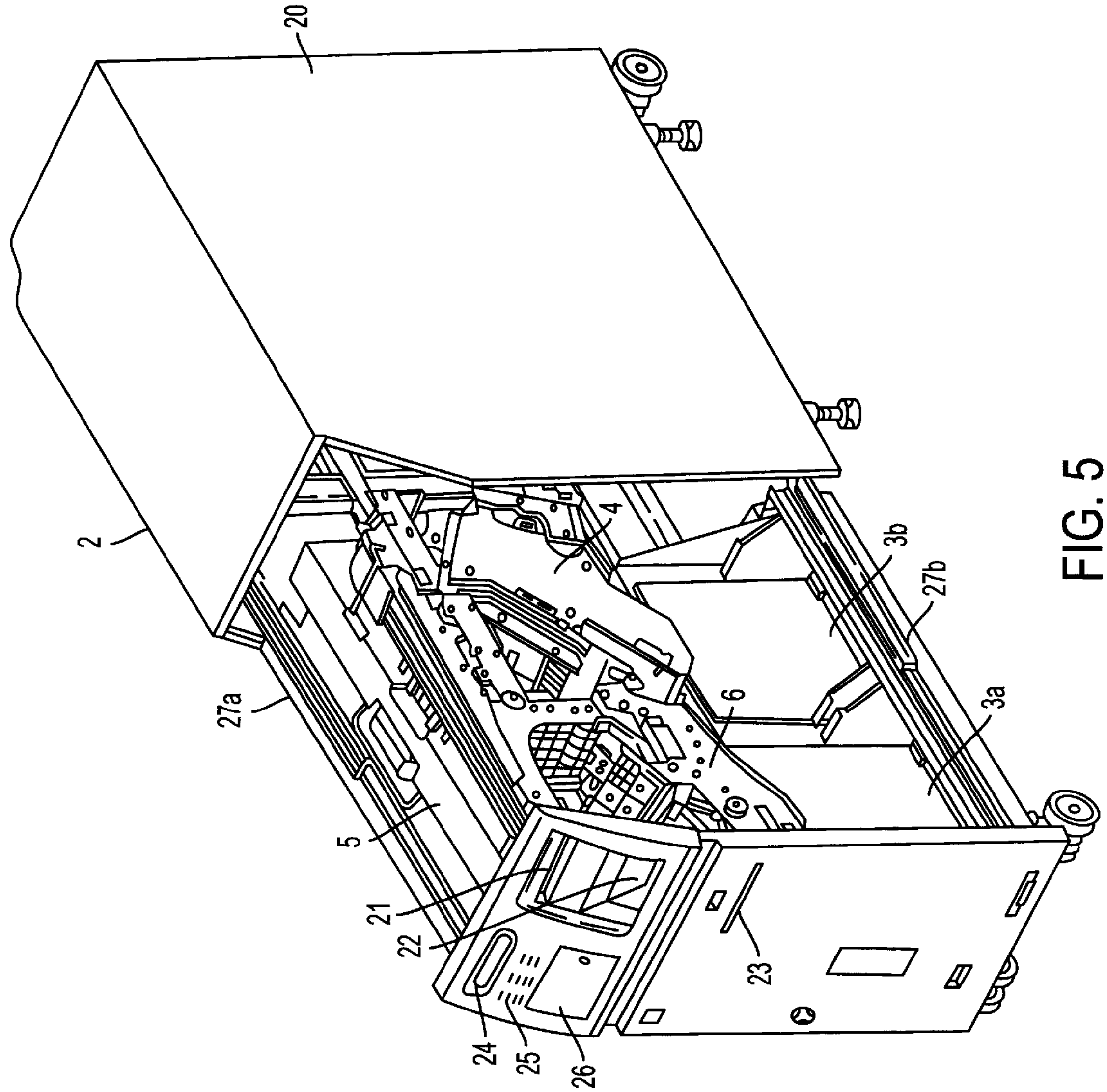
FIG. 5 is a perspective view of the airline ticket printer of FIG. 4 in which all the units are drawn out.
Figure 6:
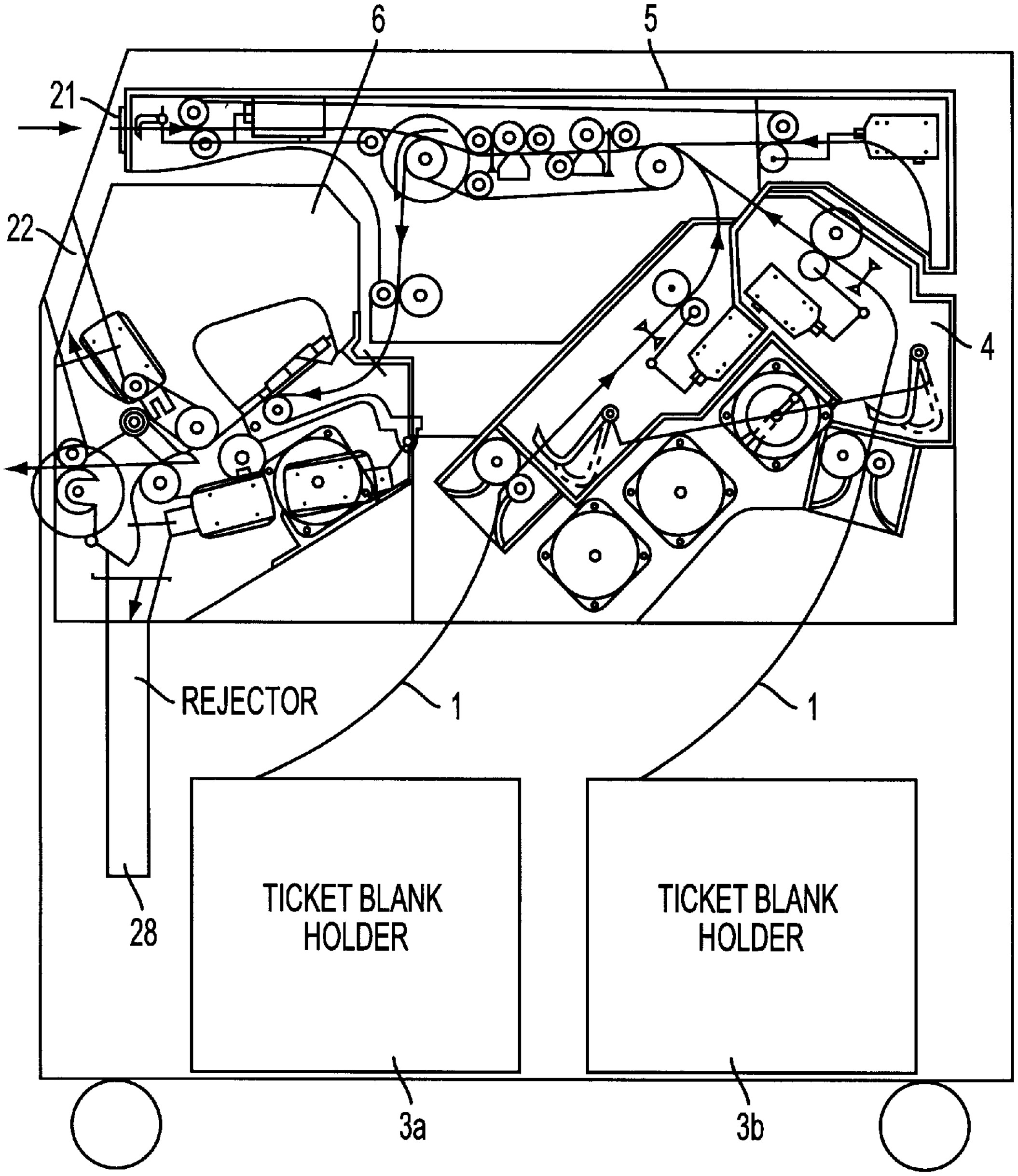
FIG. 6 is a sectional view of the airline ticket printer of FIG. 4.

Referring then to FIGS. 5 and 6, the printer 2 includes in its lower portion ticket blank stock holders 3*a* and 3*b* in which the continuous paper 1 shown in FIG. 2 is set in order and kept in stock. The printer 2 further includes a pre-feeder unit 4 in which the continuous paper 1 fed from the ticket blank stock holders 3*a* and 3*b* is cut and separated into individual tickets blanks 1*a* and the ticket blanks are put in order in the widthwise direction and then in a ready-for-further-feeding state, an MS (magnetic recording) unit 5 for magnetically recording on the magnetic stripe 11 of each separated ticket blank 1*a* ticketing data (for instance, destination, departure and arrival dates and times, flight number, seat number, and so on), and a printer unit 6 for thermally printing on the side 12, to be printed, of the magnetically recorded ticket blank 1*a*, ticketing data (for instance, destination, departure and arrival dates and times, flight number, seat number, and so on) for issuance.

Also, built in the printer 2 are slide rails 27*a* and 27*b* for pulling out of the housing 20 the ticket blank stock holders 3*a* and 3*b*, pre-feeder unit 4, MS unit 5, printer unit 6, and so on, and a reject unit 28 for keeping some defective tickets 1*a*, if any, in stock.

In the instant embodiment, individual tickets blanks 1*a* are stocked in the form of the continuous paper 1. This is because the respective ticket blanks 1*a* must have been serially numbered owing to being the originals of securities. The tickets being in the form of continuous paper means that pilferage is by no means feasible, unless the paper is cut; in other words, as long as the tickets are in a continuous form, it can be judged that something wrong such as pilferage has not occurred. In the case where ticket blanks are stocked in a separate state, some considerable time and labor are needed for determining whether or not pilferage has occurred, thus making their control difficult. However, if they are in a continuous form, they can then be easily controlled as securities.

On the other hand, some difficulty is involved in feeding continuous paper directly for magnetic recording, and the continuous paper, if ejected, must be cut manually. For these reasons, the invention is designed such that the continuous paper 1 is cut and separated into individual ticket blanks through the pre-feeder unit 4, and they are then magnetically recorded through the MS unit 5 and finally printed through the printer unit 6 for issuance.

In addition, the pre-feeder unit 4 is designed such that each ticket blank 1*a* previously cut and separated there is put in a ready-for-further-feeding state and, by an issuance order, is fed to the MS unit 5, thereby improving the issuance speed.

Furthermore, the printer unit 6 works on a direct printing mode making use of a thermal head, so that printing can be made easily and in a timesaving and laborsaving manner as well.

The ticket printer according to this embodiment is reduced in height and in depth as well by locating the ticket stock holders 3*a* and 3*b* in its lower region and locating the pre-feeder, MS and printer units 4, 5 and 6 above them. In particular, the ticket printer is made further compact by disposing the pre-feeder unit 4 diagonally to extend the ticket blank feed passage from the lower portion to the back side thereof and then from the back side to the front side thereof.

In order to print and magnetically record data on a manually inserted ticket blank, the ticket blank is inserted into the MS unit 5 through the inlet port 21 for magnetic recording and then printed through the printer unit 6 for issuance. The provision of the internal stacker 22 enables a large quantity of tickets for party travelers, for instance, to be stacked up and issued.

Each part of such an airline ticket printer will now be explained at great length. Reference will first be made to FIGS. 7, 8, 9, 10A and 10B.

Figure 7:
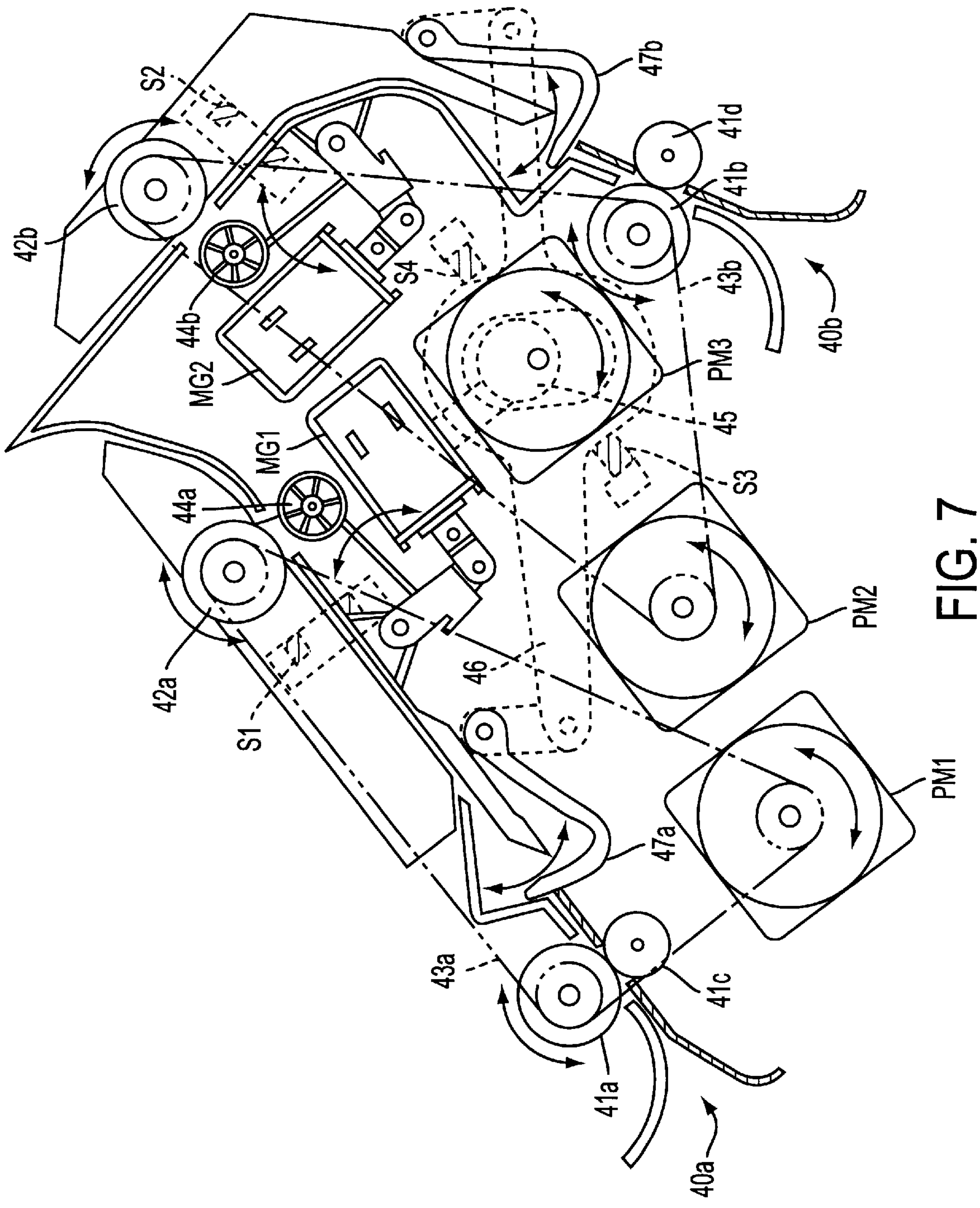
FIG. 7 is a sectional view of the pre-feeder unit of the airline ticket printer of FIG. 6.

As can be seen from FIG. 7, there are provided ticket suction ports 40*a* and 40*b* through which the continuous paper 1 is sucked from the ticket blank stock holders 3*a* and 3*b*, feed rollers 41*a* and 41*b* for paper feeding and pinch rollers 41*c* and 41*d* for feeding the paper while it is held between the feed rollers 41*a* and 41*b*. Also, there are provided ejection rollers 42*a* and 42*b* for paper feeding and pinch rollers 44*a* and 44*b* for feeding the paper while it is held between the rollers 42*a* and 42*b*. Additionally, there are provided pulse motors PM1 and PM2 for driving the rollers 41*a*, 42*a* and 41*b*, 42*b* and timing belts 43*a* and 43*b* for rotating the rollers 41*a*, 42*a* and 41*b*, 42*b* by the rotational forces of the pulse motors PM1 and PM2.

Magnets MG1 and MG2 are provided for engaging or disengaging the pinch rollers 44*a* and 44*b* with or from the rollers 42*a* and 42*b*, and sensors S1 and S2 are located for detecting that a cut medium passes by and is present or absent. Reference numeral 45 represents a cam for driving a link 46 linearly, PM3 a pulse motor for rotating the cam 45, 46 a link designed to move linearly by the rotation of the cam 45, and 47*a* and 47*b* burst cutters that are driven by the link 46 for burst-cutting the perforation 17 in the continuous paper 1. S3 represents a sensor for sensing the location of the link 46, thereby detecting that the cutters 47*a* and 47*b* are at their positions available for cutting, and S4 denotes another sensor for sensing the location of the link 46, thereby detecting that the cutters 47*a* and 47*b* are at their retracted positions.

Figure 8:
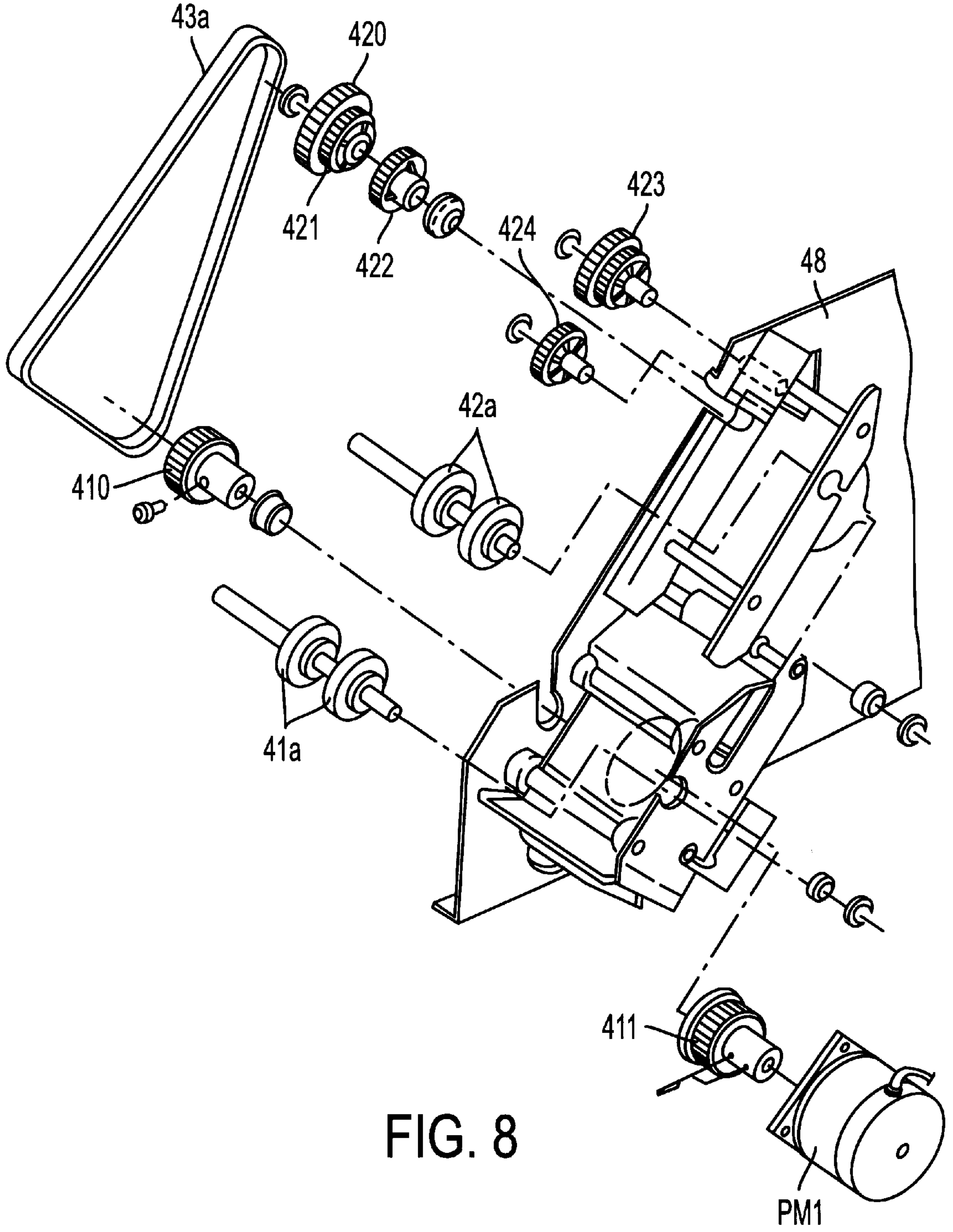
FIG. 8 is an exploded perspective view of the pre-feeder unit of FIG. 7.
Figure 9:
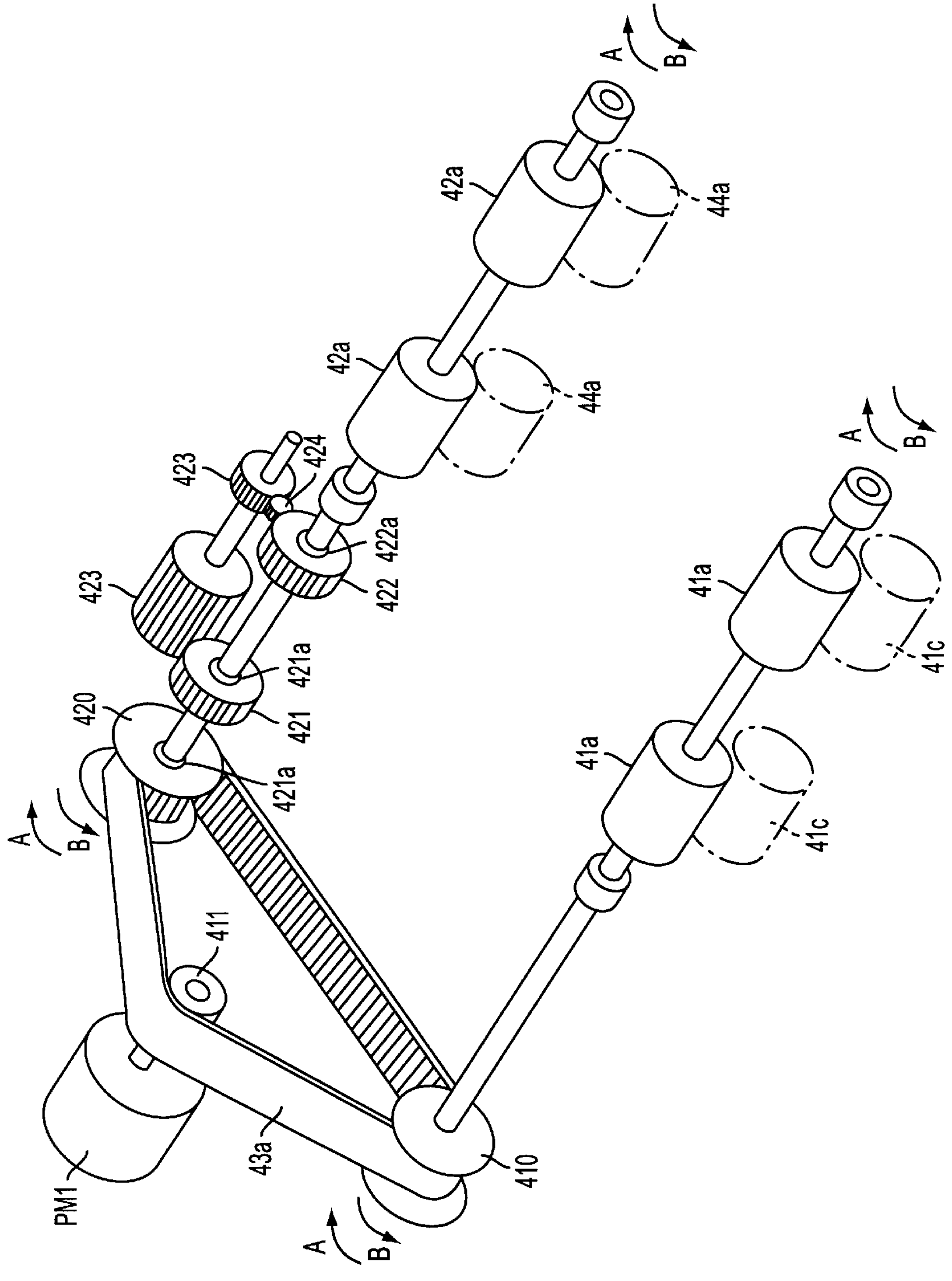
FIG. 9 is a perspective view of the pre-feeder unit of FIG. 8 that is in a finished-up state.

As can be seen from FIGS. 8 and 9, the feed rollers 41*a* and 42*a* are attached to a unit frame 48 of the pre-feeder unit 4. This feed roller 41*a* is provided with a gear 410 that meshes with the timing belt 43*a* driven by a driving gear 411 of the pulse motor PM1. Similarly, the feed roller 42*a* is provided with a gear 420 that meshes with the timing belt 43*a*, a gear 421 integral with the gear 420, a gear 422 and auxiliary gears 423, 424.

Figure 10A:
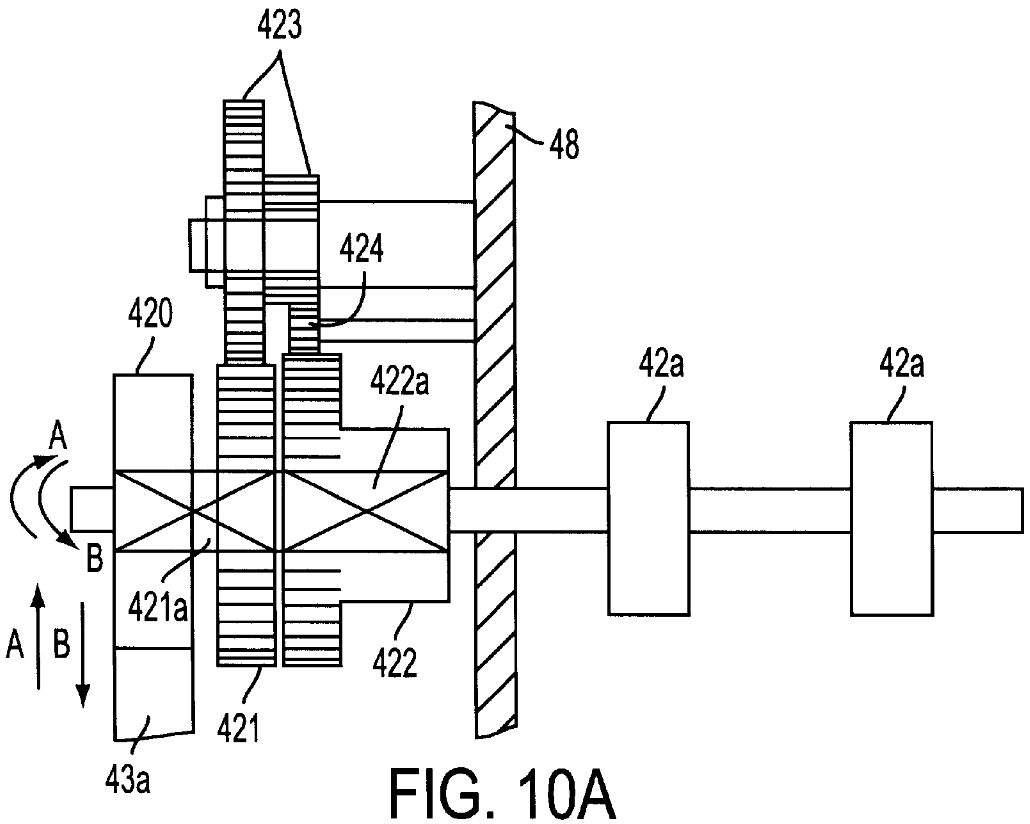
FIGS. 10A and 10B are diagrams showing part of the pre-feeder unit of FIG. 7.

As illustrated in FIG. 10(A), the gears 420 and 421 of the feed roller 42*a* are provided therethrough with a one-way clutch 421*a* that works only in the direction shown at B in this figure, and the gear 422 is provided therethrough with a one-way clutch 422*a* as well, which works only in the direction shown at B in this figure. Then, the auxiliary gear 423 meshes with the gear 421, the auxiliary gear 424 meshes with the auxiliary gear 423, and the gear 422 meshes with the auxiliary gear 424.

As can be seen from FIG. 10(A), as the timing belt 43*a* is driven in the direction B, the rotations of the gears 420 and 421 are transmitted to the shaft of the feed roller 42*a* by way of the one-way clutch 421*a*, so that the feed roller 42*a* can rotate in the direction B or forwardly. At this time, the gear 422 is rotated in the direction A or backwardly by the gear 421 through the auxiliary gears 423 and 424, but it remains idle by the operation of the one-way clutch 422*a*.

Then, as the timing belt 43*a* is driven in the direction A in FIG. 10(A), the gears 420 and 421 rotate, but they remain idle by the operation of the one-way clutch 421*a*. This in turn causes the gear 422 to rotate by the gear 421 by way of the auxiliary gears 423 and 424 in the direction B or forwardly in this figure, so that its rotation can be transmitted to the shaft of the feed roller 42*a* by the one-way clutch 422*a*, thereby rotating the feed roller 42*a* in the direction B or forwardly in this figure.

Thus, the feed roller 42*a* can be rotated in the direction B or forwardly, irrespective of whether the timing belt 43*a* is fed in the direction A (forwardly) or B (backwardly), enabling the medium to be fed forwardly.

Figure 10B:
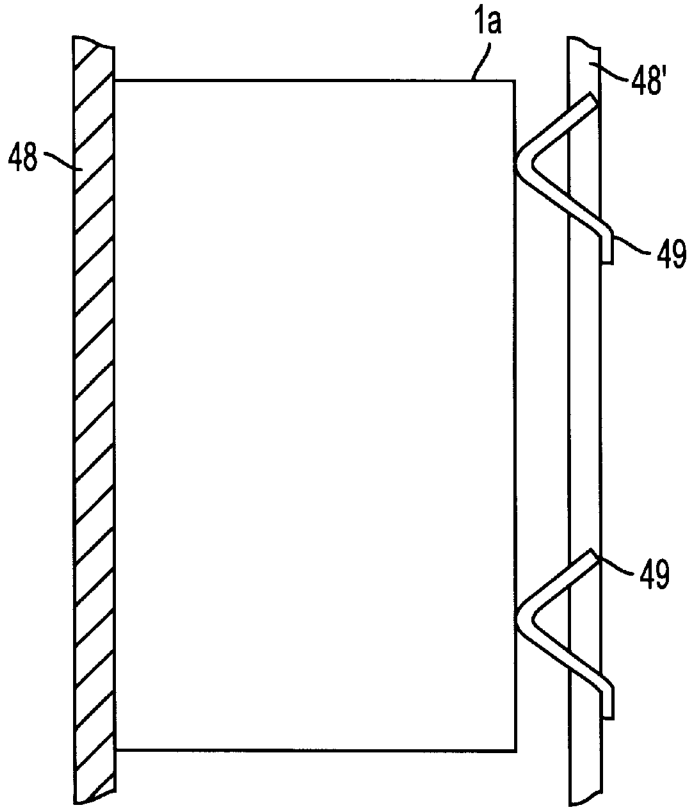

As illustrated in FIG. 10(B), a right-hand frame 48' is provided with a biasing spring 49 that serves to engage each cut ticket blank 1*a* with a left-hand frame 48, so that it can be put in order in the widthwise direction.

While the arrangement shown in FIGS. 8–10 has been described chiefly with reference to the suction port 40*a* that corresponds to the ticket blank holder 3*a* shown in FIG. 7, it is understood that this is true of the suction port 40*b* that corresponds to the ticket blank holder 3*b*.

How the pre-feeder unit 4 works will now be explained with reference to FIGS. 11, 12A, 12B, 13A and 13B.

Figure 12A:
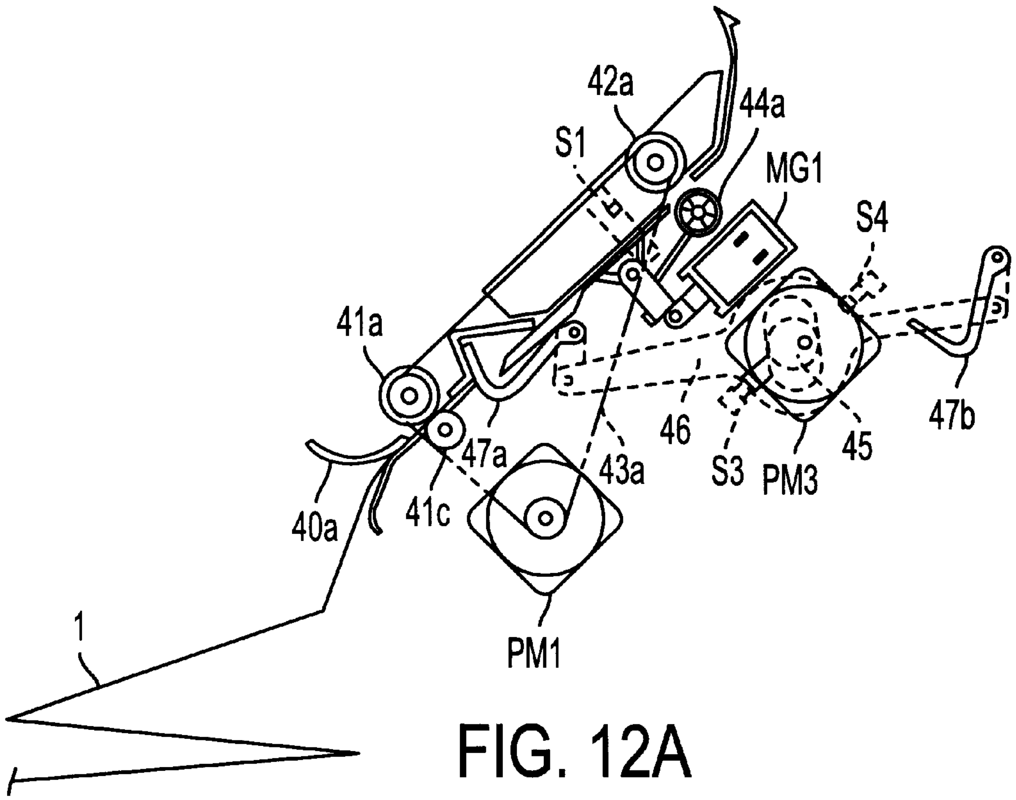
FIGS. 12A and 12B are diagrams of how the pre-feeder unit of FIG. 7 works.

In their initial state shown in FIG. 12(A), the cutters 47*a* and 47*b* are at their ready-to-cut positions, and so block up the feed passage. In this state, the operator operates an associated lever, not shown, to retract the pinch roller 41*c*, and then inserts the continuous paper 1 into the suction port 40*a* until it abuts against the back of the cutter 47*a*. Thereafter, the operator operates the lever to close up the pinch roller 41*c*, and then inserts the leading end of the continuous paper 1 between the feed roller 41*a* and the pinch roller 41*c* for setting the continuous medium in place.

Figure 11:
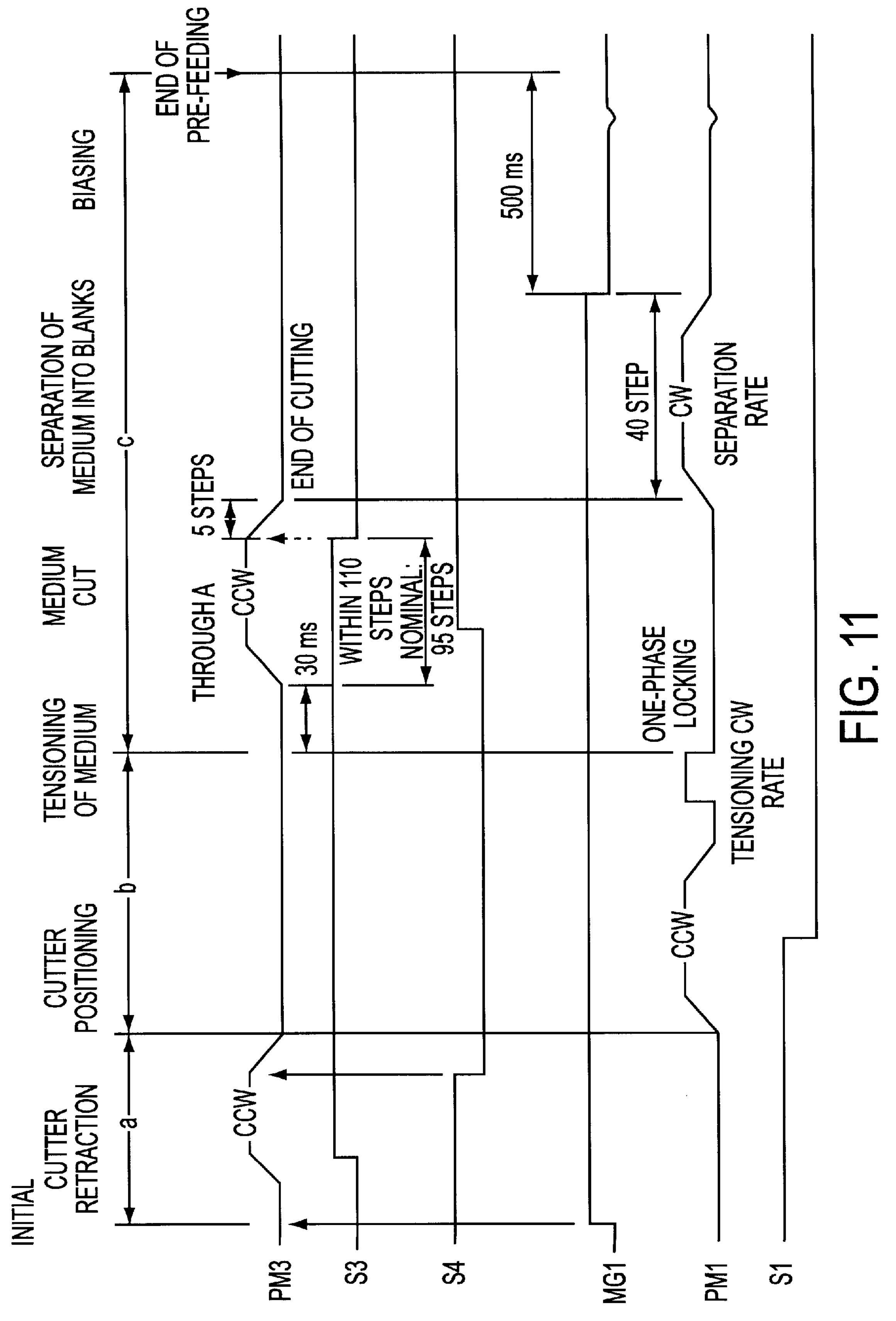
FIG. 11 is a performance time chart of the pre-feeder unit of FIG. 7.
Figure 12B:
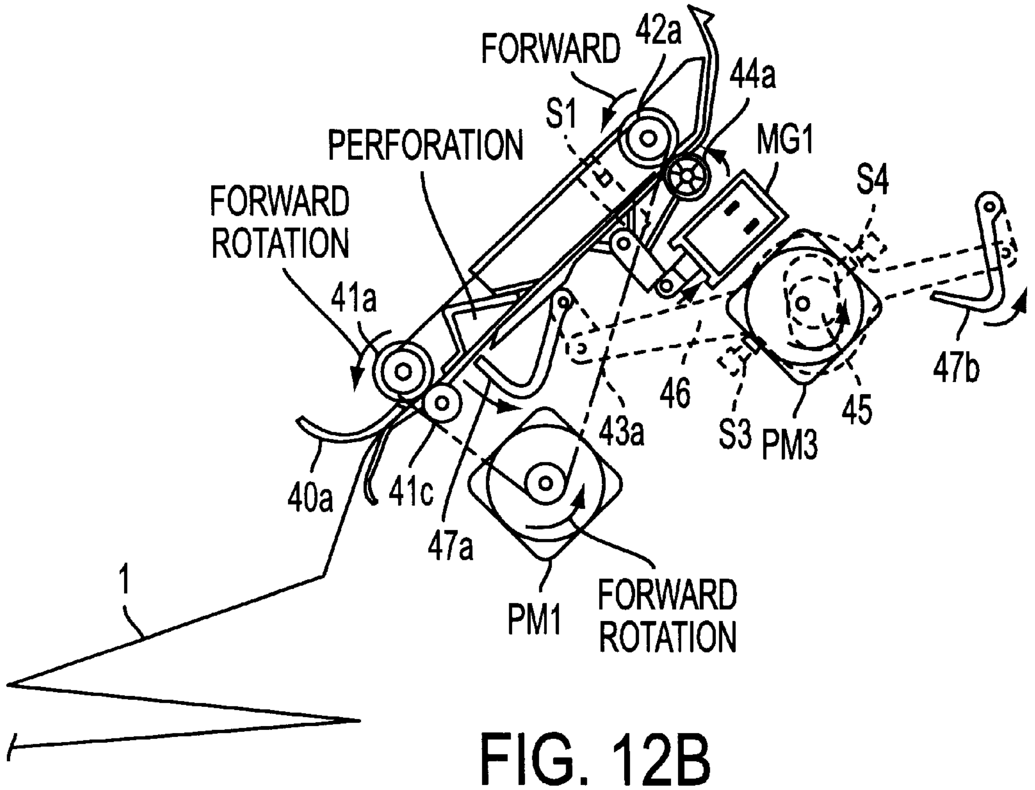

Then, the magnet MG1 is first driven to close up the retracted pinch roller 44*a* so as to retract the cutter 47*a*, as shown in FIG. 12(B). Subsequently, the pulse motor PM 3 for the cutter is rotated counterclockwise (or in the CCW direction) to move the link 46 by the cam 45 in the right-handed direction in this figure, thereby retracting the cutter 47*a*. The rotation of this pulse motor PM 3 is put off, when the output of the sensor S4 is so low that it reaches its retracted position, as shown in FIG. 11.

With the pulse motor PM1 for paper feed rotated counterclockwise (or in the forward direction), the feed rollers 41 and 42*a* are then rotated in the forward direction by the timing belt 43*a* for paper feed. The pulse motor PM1 stops upon the perforation 17 of the medium 1 reaching the location of the cutter 47*a*. This is because the output of the sensor S1 decreases upon detecting that the leading end of the medium 1 passes by. In this state, the perforation 17 in the medium (continuous paper) 1 is positioned at the location of the cutter 47*a*.

Figure 13A:
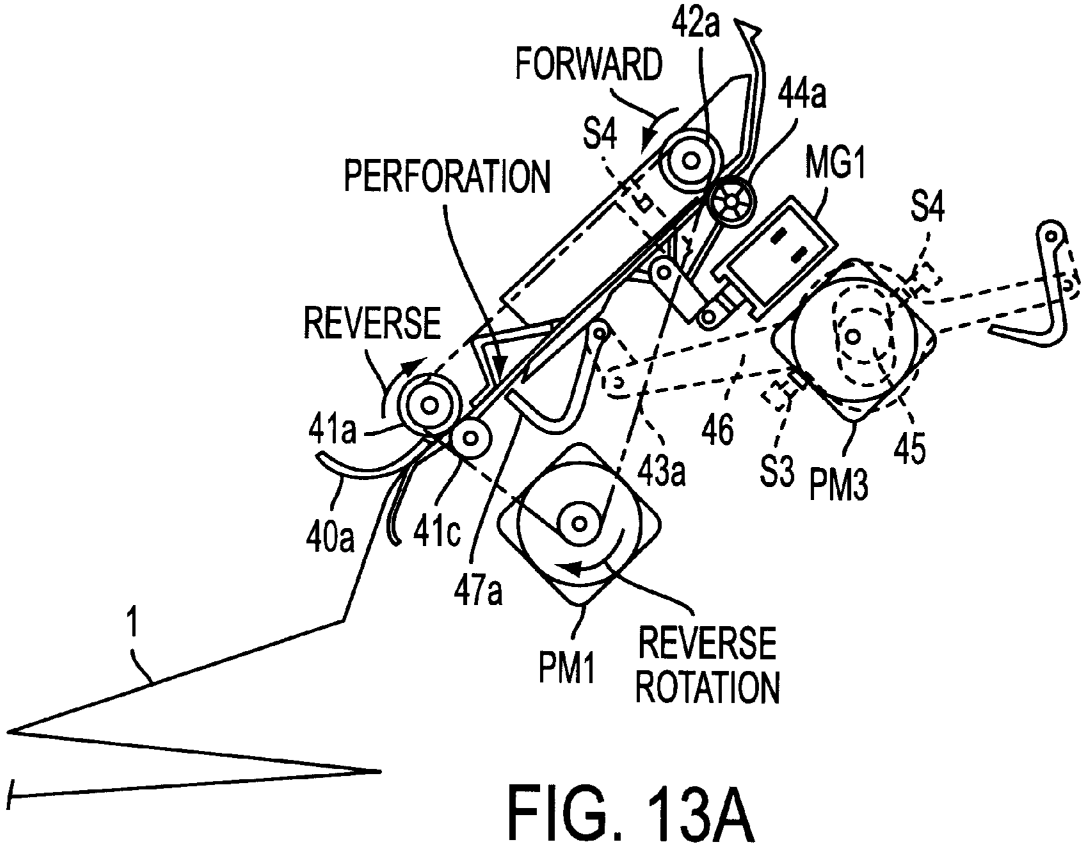
FIGS. 13A and 13B are diagrams of how the pre-feeder unit of FIG. 7 works.

Then, the PM1 for paper feeding is rotated 2 to 5 steps clockwise (or in the CW direction), as shown in FIG. 13(A). This in turn causes a reversal of the feed roller 41*a* and a forward rotation of the feed roller 42*a* by the operations of the above-mentioned one-way clutches 421 and 422*a* shown in FIG. 10, thereby pulling the medium 1 by both the feed rollers 41*a* and 42*a* to impart tension to the medium 1, thereby making it easy to cut the medium 1.

With no tension imparted to the medium 1, the continuous medium 1 may become loose at the location of the cutter due to a difference in the feed speed between both the feed rollers 41*a* and 42*a* that is caused by their outer diameter accuracy, making the proper cutting of the medium 1 unlikely. In the instant embodiment, however, tension can be applied by the feed rollers 41*a* and 42*a* to the medium. In other words, the feed mechanism itself has the ability to impart tension to the medium, and so can be simplified in structure.

Figure 13B:
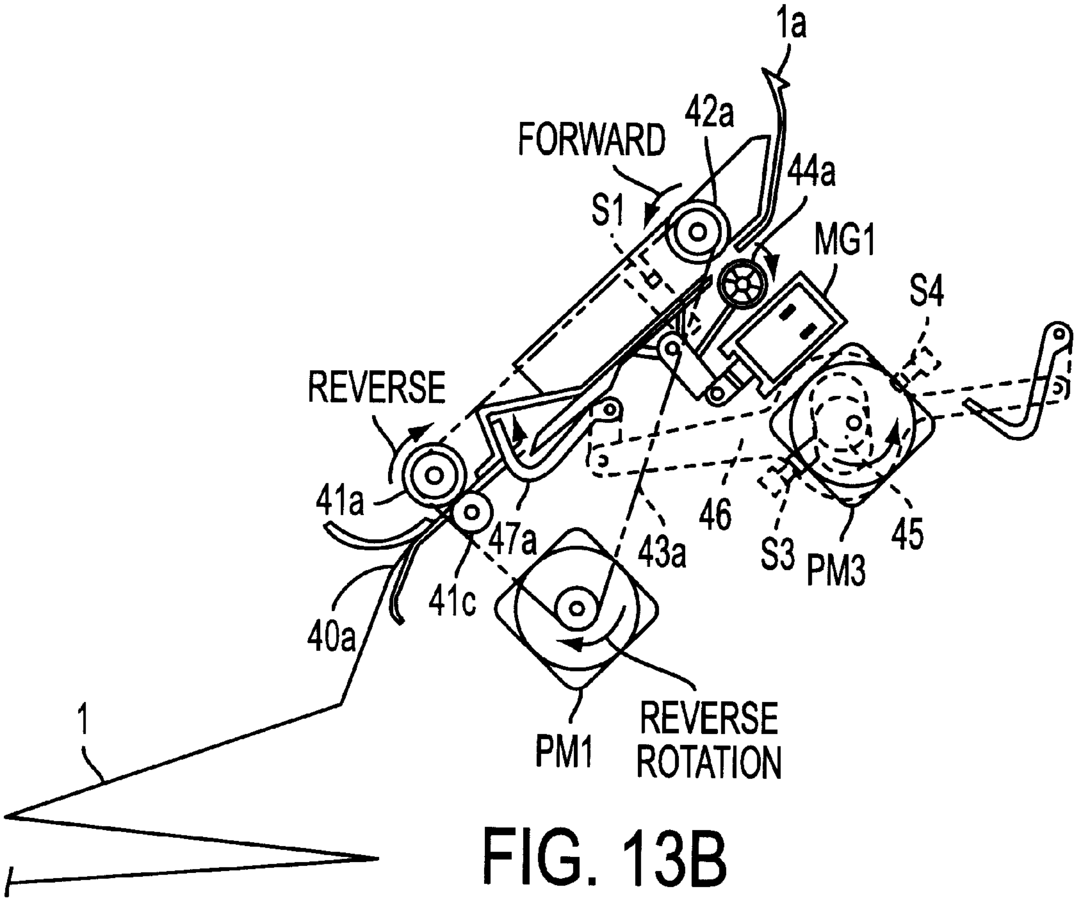

As shown in FIG. 13(B), the pulse motor PM 3 for the cutter is further rotated counterclockwise to move the link 46 by the cam 45 in the left-handed direction in this figure, so that the cutter 47*a* can beat the perforation 17 of the medium 1 for burst-cutting.

The medium 1 can then be cut easily and surely, because tension is imparted to the medium 1, as shown in FIG. 13(A), and because the perforation 17 in the medium 1 is cut on both its sides, as shown at 18.

After the cutting of the medium is completed, the pulse motor PM 1 is rotated 40 steps clockwise (or in the CW direction), as shown FIG. 11. This in turn causes a reversal of the feed roller 41*a* and a forward rotation of the feed roller 42*a* by the operations of the above-mentioned one-way clutches 421*a* and 422*a* shown in FIG. 10, thus separating the cut medium 1*a* from the continuous medium 1 and putting it in a ready-for-further-feeding state on the ejection port side.

After that, as the magnet MG1 is put off, as shown in FIG. 11, the pinch roller 44*a* is retracted to enable each cut medium 1*a* to be widthwise engaged with the left-hand frame 48 by the biasing spring 49 attached to the right-handed side frame 48', shown in FIG. 10(B). In this manner, the pre-feeding of each ticket blank is completed.

Upon receipt of an issuance command, the sequences from FIG. 12(B) occur, and the cut medium 1*a* that is standing ready for further feeding is fed to the magnetic recording unit 5, while the continuous medium 1 is fed and cut and then allowed to stand ready for further feeding.

Because the set continuous paper 1 is precut into individual ticket blanks 1*a* ready for further feeding, each ticket blank 1*a* can be fed to the magnetic recorder unit 5 just upon receipt of issuance instructions, thereby improving issuance speed.

While the operations of the parts located on the suction port (40*a*) side corresponding to the ticket blank holder 3*a* have been described with reference to FIGS. 12A, 12B, 13A and 13B, it is understood that those on the suction port (40*b*) side corresponding to the ticket blank holder 3*b* operate similarly. In this case, the cutter-driving PM 3, cam 45 and link 46 are commonly used.

The magnetic recording unit 5 will now be explained with reference to FIGS. 14, 15, 16A and 16B.

Figure 14:
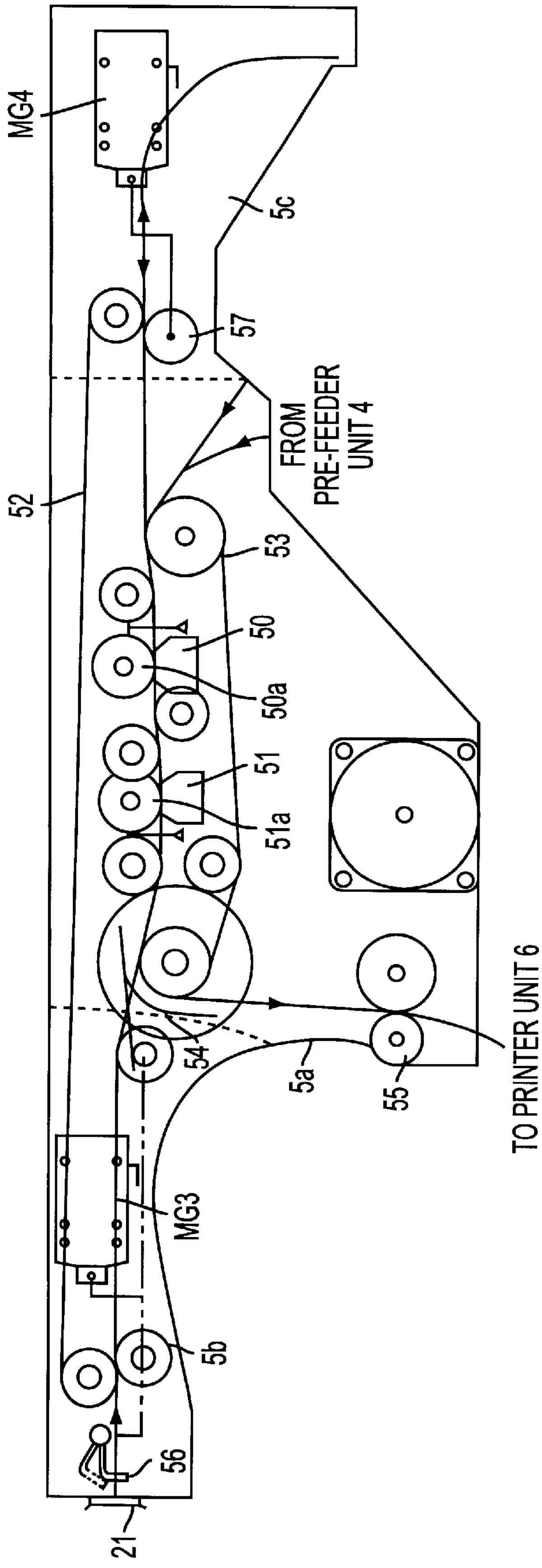
FIG. 14 is a sectional view of the MS unit of the airline ticket printer of FIG. 6.
Figure 15:
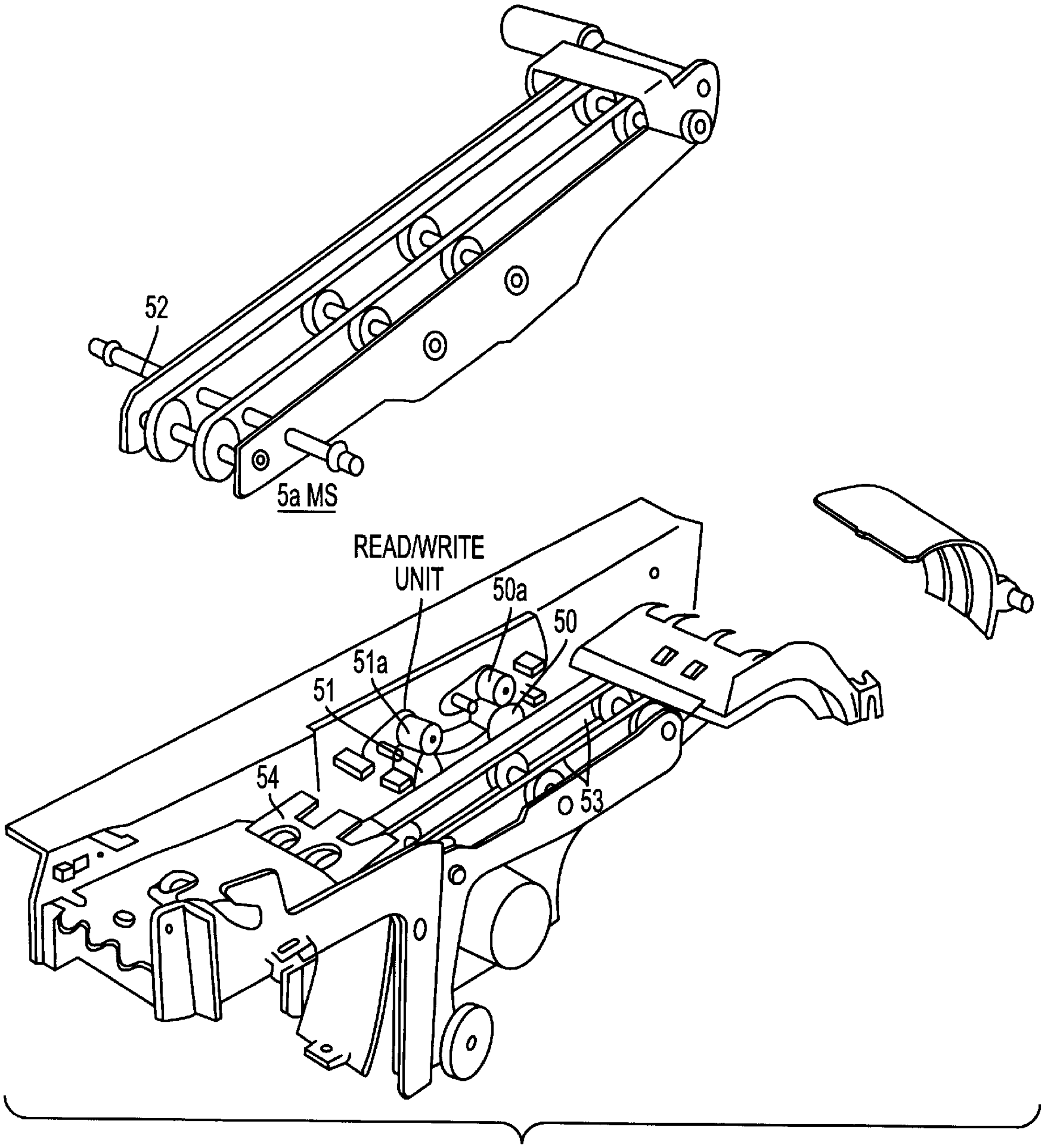
FIG. 15 is a perspective view of the MS unit of FIG. 14.

As shown in FIG. 14, the MS (magnetic recording) unit 5 includes a manually-inserting portion 5*b* for receiving a manually inserted ticket blank, an MS read-write unit 5*a* for magnetically recording data on the magnetic stripe 11 of the ticket blank and a portion 5*c* in which the manually inserted ticket blank stands ready for further feeding. As shown in FIGS. 14 and 15, an upper feed belt 52 is provided all over the hand-inserting portion 5*c*, the MS read-write portion 5*a* and the portion 5*c*.

The MS read-write unit 5*a* is provided with a lower feed belt 53 for feeding the ticket blank 1*a* while it is held between the upper and lower feed belts 52 and 53, a write head 50 for magnetically recording data on the magnetic stripe 11 of the ticket blank 1*a* and a read heat 51 for read-after-write check.

Further, there are provided a guide roller 50*a* opposite to the write head 50, a guide roller 51*a* opposite to the read head 51, a gate 54 for guiding the magnetically recorded ticket 1*a* to the printer unit 6 or the hand-inserting portion 5*b*, and a discharge roller 55 for ejecting the ticket 1*a* into the printer unit 6.

The manually-inserting portion 5*b* includes a shutter 56 located on an inserting port 21 and a magnet MG3 that opens the shutter 56 in association with hand insertion, thereby switching the gate 54 over to the hand-inserting portion 4*b*.

The standby portion 5*c* includes a roller 57 opposite to the upper feed belt 52 and a magnet MG4 for moving and engaging the roller 57 toward and with the upper feed belt 52.

Figure 16A:
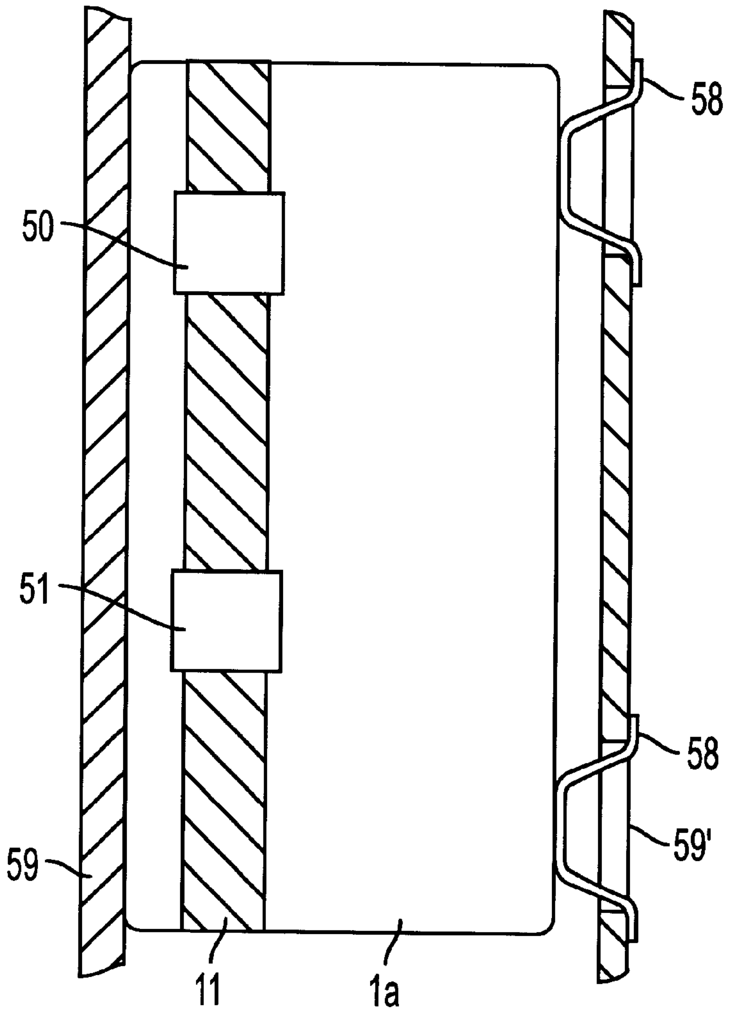
FIGS. 16A and 16B are diagrams of the MS unit of FIG. 14.

As shown in FIG. 16A, the MS read-write unit 5*a* includes a biasing spring 58 attached to a right-hand frame 59', which serves to bias the ticket blank 1*a* at the write and read heads 50 and 51 against a left-hand frame (guide).

Figure 16B:
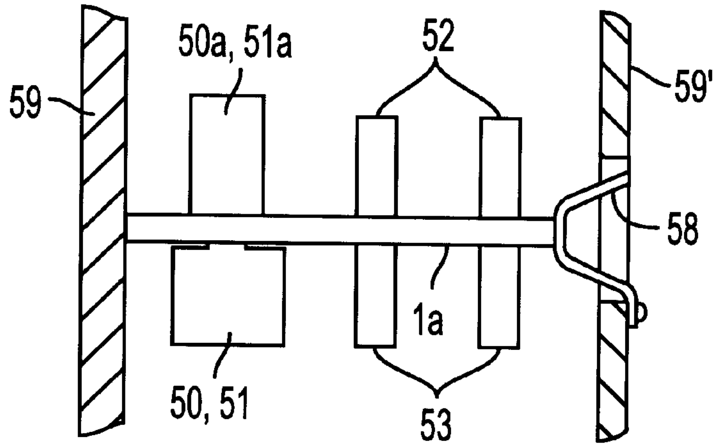

Explaining this operation, the ticket blank 1*a* fed from the pre-feeder unit 4 is supplied, while it is sandwiched between the upper and lower feed belts 52 and 53 in FIG. 16B, to the write head 50 where data are magnetically recorded on the magnetic stripe 11 of the ticket blank 1*a*. Then, it is further fed to the read head 51 where the data are read, and ejected into the printer unit through the ejection roller 55 by way of the gate 54.

In this case, it is assured that the data can be written onto the magnetic stripe by the write head 50 and read therefrom by the read head 51, because the ticket blank 51*a* is carried while it is biased by the biasing spring 58 against the left-hand guide 59 on the side at which there are the heads 50 and 51. Also, since the ticket blank is fed by the feed belts 52 and 53 without undergoing any speed change, it is assured that the data can be written onto the magnetic stripe 11 by the head 50 and read therefrom by the head 51.

In the case of the manually inserted ticket blank, on the other hand, the shutter 56 is opened by the magnet MG3 and the gate 54 is actuated to connect the hand-inserting portion 5*b* with the MS read-write portion 5*a*. Then, the ticket blank 1*a* is fed by the upper feed belt 52 through the inserting port 21 and the read-write portion 5*a* to the standby portion 5*c* where it stands ready for further feeding as shown in FIG. 14.

Upon receiving an issuance order, the magnet MG4 of the standby portion Sc is driven to feed the ticket blank 1*a* to the MS read-write unit 5*a* while the roller 57 is engaged with the upper belt 52. Through the MS read-write unit 5*a*, the ticket blank 1*a* is fed while it is sandwiched between the lower belts 52 and 53, in the course of which the data are magnetically recorded on the magnetic stripe 11 of the ticket blank 1*a* and read therefrom by the read head 51. Then, the ticket blank 1*a* is ejected by the ejection roller 55 into the printer unit 6 by way of the gate 54.

The printer unit 6 will now be explained with reference to the FIG. 17.

Figure 17:
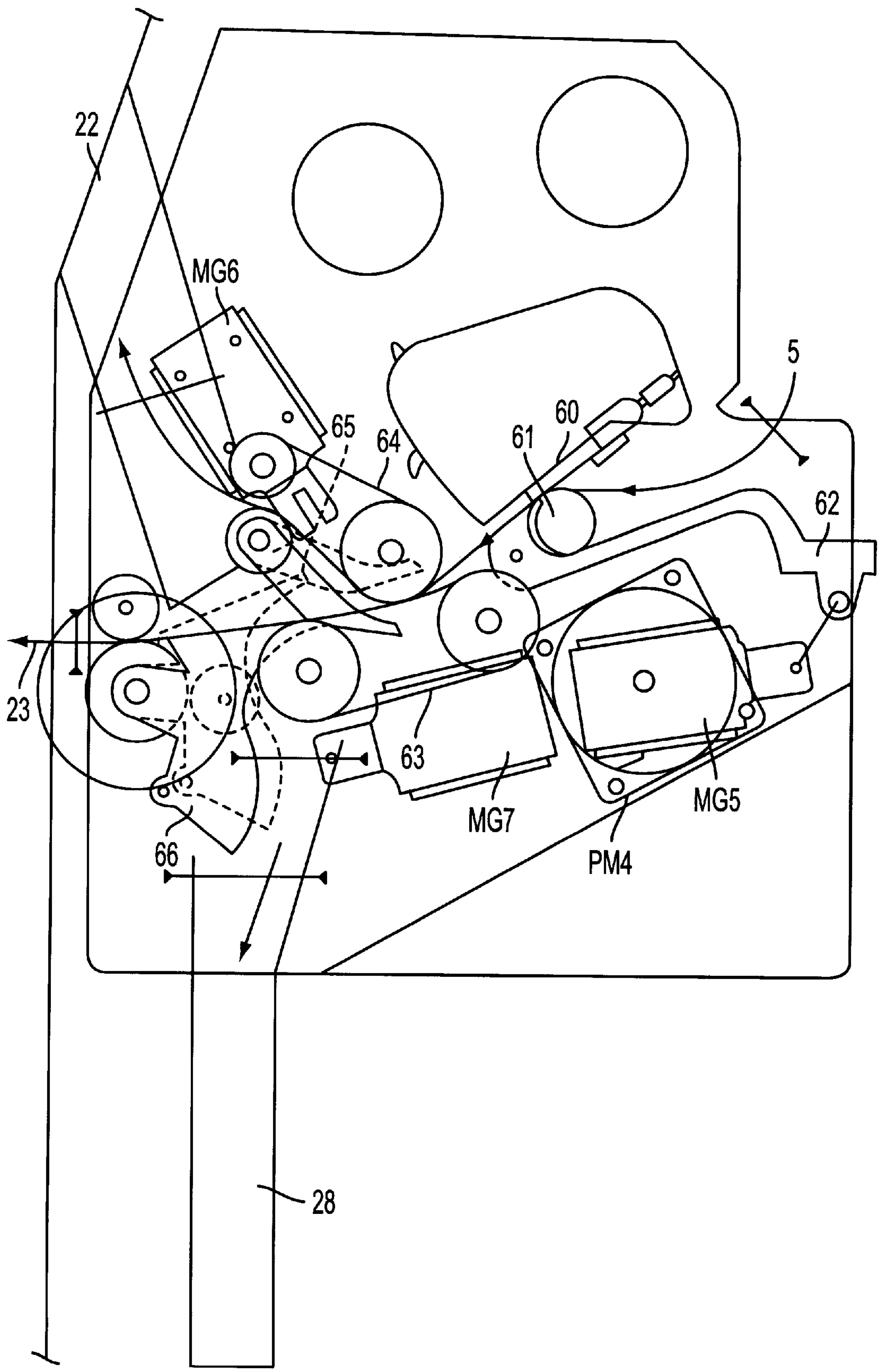
FIG. 17 is a sectional view of the printer unit of the airline ticket printer of FIG. 6.

In FIG. 17, reference numeral 60 represents a line thermal head for the thermal printing of the heat-sensitive ticket blank including the protective layer, shown in FIG. 1, 61 a platen that is located in opposition to the thermal head 60, 62 a lever for keeping the space between the thermal head 60 and the platen 61 constant, and MG5 a magnet for driving the lever 62.

Reference numeral 63 is a feed belt for feeding the printed ticket 1*a* toward the ejection port 23, 64 a feed belt for carrying the printed ticket 1*a* to the hopper (internal stacker) 22, 65 a gate for guiding the printed ticket 1*a* to the hopper 22 or the discharge port 23, and MG6 a magnet for driving the gate 65 for switching-over.

Reference numeral 66 denotes a gate for guiding the printed ticket 1*a* to the reject box 28 or the ejection portion 23, MG7 a magnet for driving the gate 66 for switching-over, and PM4 a pulse motor for driving the feed belt 64, etc.

Explaining this operation, the ticket blank 1*a* fed from the MS unit 5 strikes on the thermal head 60 where its leading end is properly positioned and whence it is fed to the platen 61, in the course of which it is linearly printed.

In order to eject the ticket blank 1*a* into the ejection port 23, the magnet MG6 is put on to locate the gate 65 at a position shown by a dotted line in FIG. 17. The gate 66 is then located at a position shown by a solid line in this figure, so that the ticket 1*a* can be ejected into the ejection port 23. For ejection into the hopper 22, on the other hand, the magnet MG6 is put off to locate the gate 65 at the position shown by a solid line in FIG. 17, thereby guiding the ticket 1*a* into the hopper 22.

If the ticket is rejected due to some error in magnetic recording, etc., the magnet MG7 is then put on to locate the gate 66 at the position shown by a dotted line in FIG. 17, thereby guiding that ticket 1*a* into the reject box 28.

In what follows, the printer unit 5 will be explained more specifically with reference to FIGS. 18, 19A, 19B, 20A and 20B.

Figure 18:
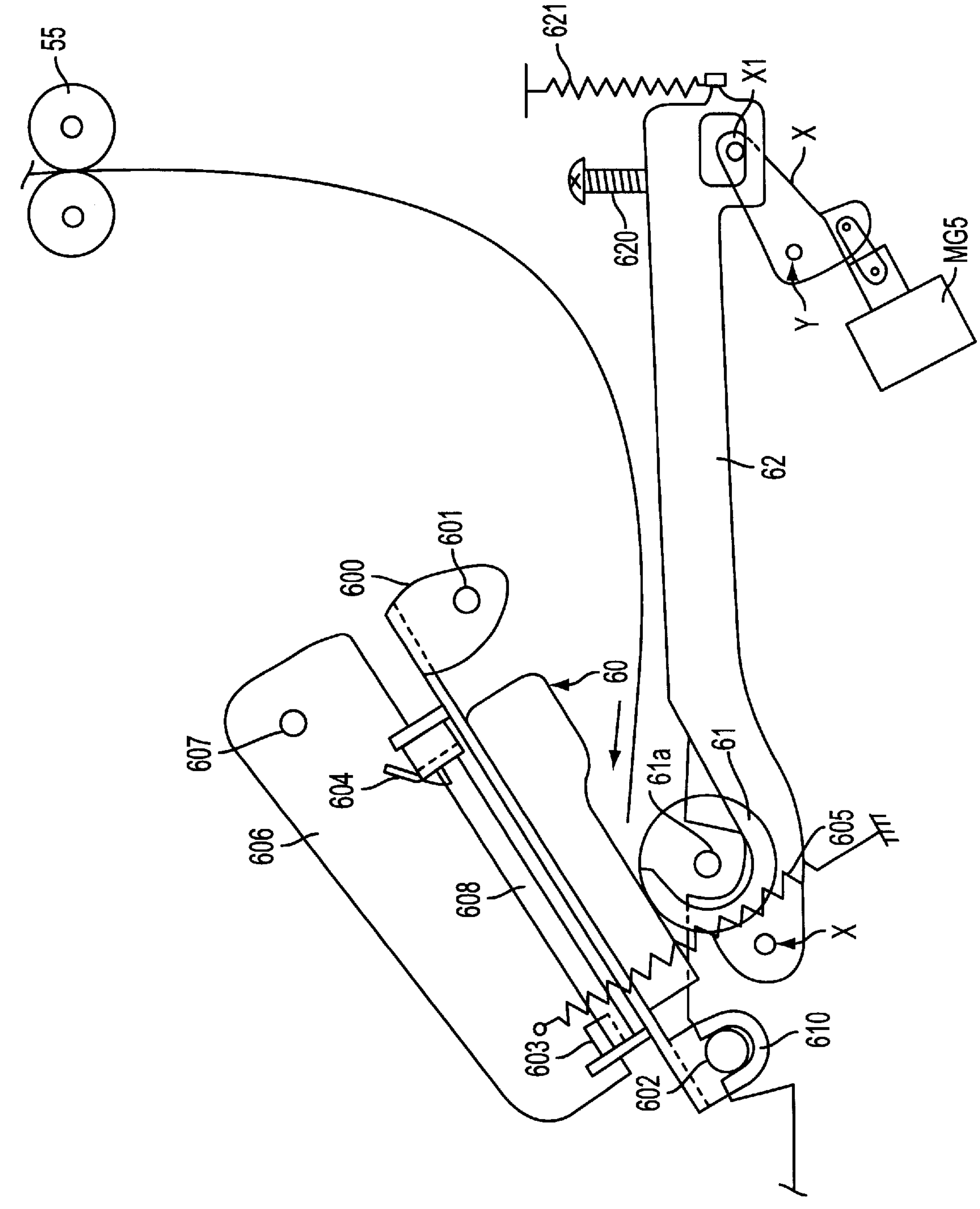
FIG. 18 is a front view showing part of the printer unit of FIG. 17.
Figure 19A:
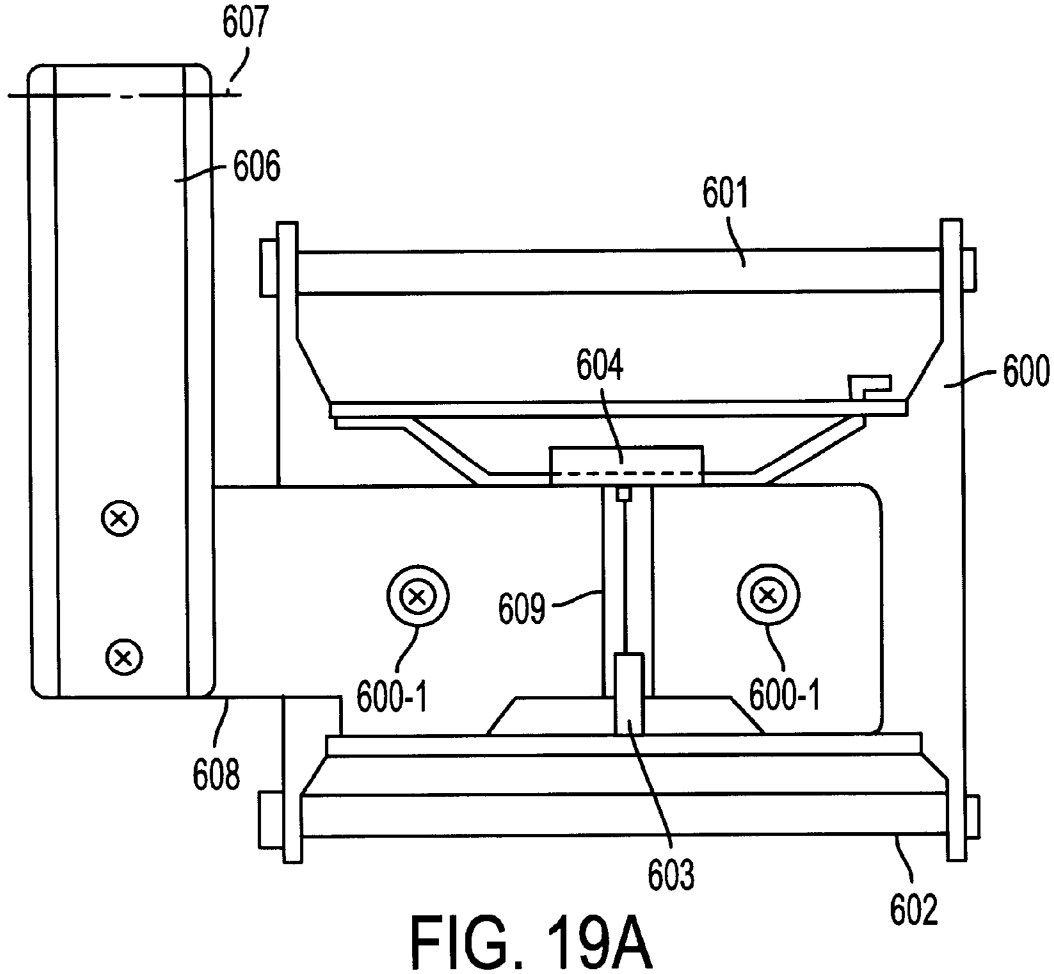
FIGS. 19A and 19B are diagrams part of the printer unit of FIG. 17.
Figure 19B:
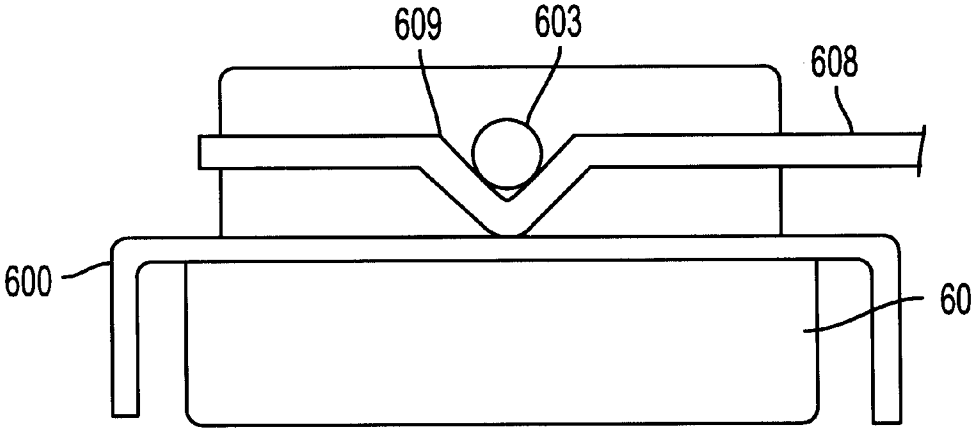

As shown in FIGS. 18, 19A and 19B, the thermal head 60 is made up of a thermal line head including an array of heat elements corresponding to one line, which are arranged in the axial direction of the platen 61, and is attached to a bracket 600 by means of a fixing screw 600-1. At both ends of the bracket 600 there are positioning shafts 601 and 602, and on the bracket 600 there is a pin 603 and a sheet spring 604.

On the other hand, the printer unit 6 is provided with a swing lever 606 that swings around its fulcrum 607. This swing lever 606 is provided with a hanger 608, and biased counterclockwise (see FIG. 18) by a spring 605. This hanger 608 receives both the pin 603 and the sheet spring 604 at its center, as shown in FIGS. 19(A) and (B), and is provided with a positioning groove 609 that comes into contact with the bracket 600. The printer unit 6 is also provided in its frame with a positioning groove 610 that engages with the positioning shaft 602 of the bracket 600.

Further, an axis 61*a* of the platen 61 opposite to the thermal head 60 is provided with a lever 62 that swings around an axis x to force up (the printing line portion of) the thermal head 60 against the biasing force of the spring 605. This lever 62 is limited by a stopper 620 in terms of the position at which it swings clockwise in FIG. 18, biased clockwise by a spring 621, and driven counterclockwise by the magnet MG 5 through a lever X.

In such an arrangement, the lever 62 abuts against the stopper 620 by the spring 621, so that it can be limited in terms of the position at which it swings, thereby spacing the thermal head 60 about 0.1–0.2-mm away from the platen 61.

At this time, the tickets 1*a* ejected through the ejection rollers 55 of the MS unit 5 abut against the diagonally positioned thermal head 60, so that their leading ends can be in alignment.

Subsequent driving of the magnet MG 5 causes the lever 62 to swing clockwise around the axis X through a shaft X of the lever X that swings around an axis Y, thereby releasing the upward displacement of the thermal head 60. This in turn causes the thermal head 60 to be engaged with the platen 61 following the biasing force of the spring 605, enabling the platen 61 to be fed and so making thermal recording by the thermal line head 60 possible.

At this time, the location of the thermal head 60 with respect to the platen 61 is assured by engaging the positioning shaft 602 of the bracket 600—to which the thermal head 60 is fixed—within the positioning groove 610 in the frame.

The horizontal location of the thermal head 60, on the other hand, is assured by engaging the pin 603 extending from the center of the bracket 600 within the positioning groove 609 in the center of the hanger 608 and biasing the opposite side thereof by means of the sheet spring 604, as shown in FIG. 19, thereby making the positioning of the thermal head 60 easier.

Further, the thermal head 60 is designed to be rotatable around the pin 603 fitted within the positioning groove 609 in the hanger 608, as shown in FIG. 19(B), so that it can turn following the platen 61, keeping printing pressure constant. This in turn enables printing density to be kept constant in dependence on a paper thickness variation, eccentricity of the platen 61, and so on.

Figure 20A:
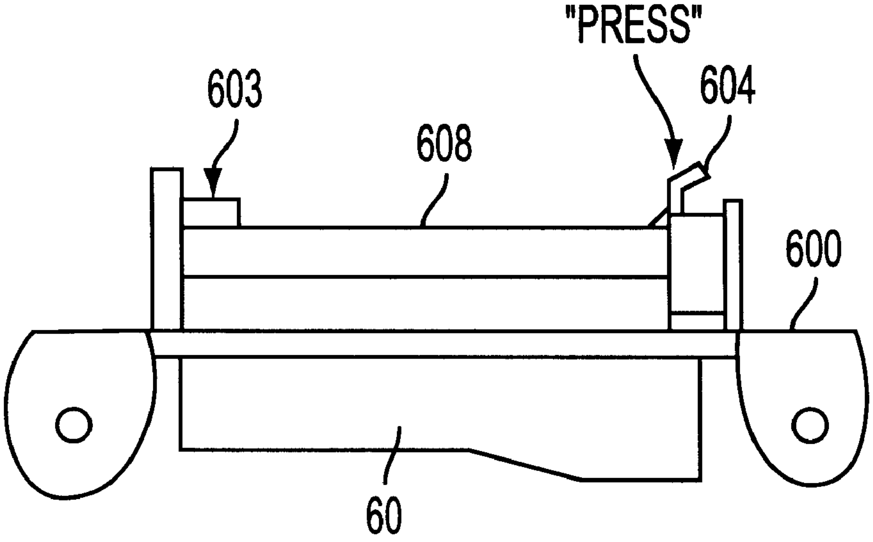
FIGS. 20 and 20B are diagrams showing the attachment or detachment of the head in the printer unit of FIG. 17.
Figure 20B:
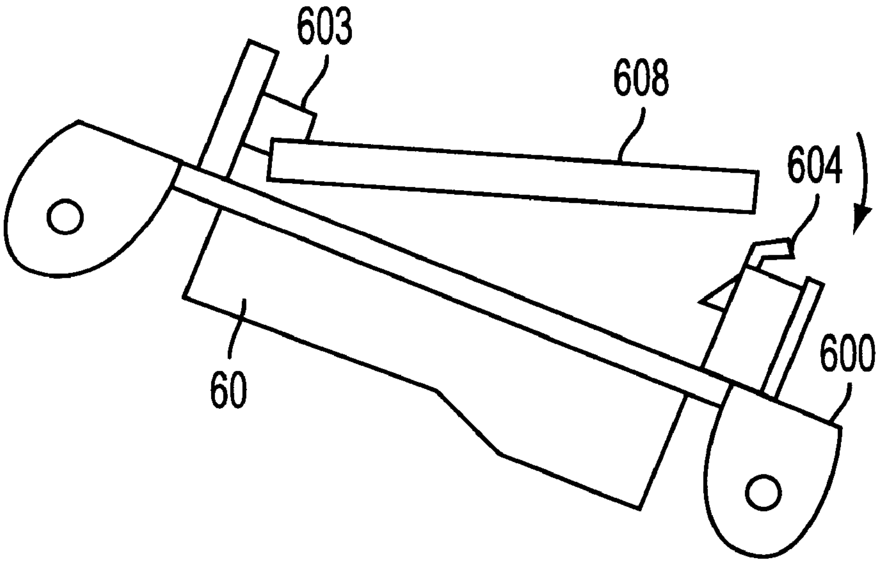

The attachment or detachment of the bracket 600 that supports the thermal head 60 in place will now be explained more specifically with reference to FIG. 20. For detachment of the thermal head 60 from the swing lever 606 of the bracket 600 that supports it in place, the spring 605 is removed to swing the swing lever 606 upward in FIG. 18. Then, the bracket 600 that fixes the thermal head 60 in place is disengaged from the platen 61 and from within the positioning groove 610. Subsequently, a push is given by a finger to the sheet spring 604 of the bracket 600, as shown in FIG. 20(A) to deform the sheet spring 604, thereby detaching the pawl of the sheet spring 604 from the hanger 608. Finally, the bracket 600 with the thermal head 60 fixed to it is turned downward, whereby the bracket 600 with the thermal head 60 fixed to it can be disengaged from the hanger 608.

The attachment of the swing lever 606 to the bracket 600 is achieved in the opposite manner as mentioned above, i.e., by fitting the pin 603 extending from the bracket 600 into the positioning groove 610 in the hanger 608 and then forcing therein the side of the bracket 600 on which the sheet spring 604 is attached.

After that, while the spring 605 is attached to the swing lever 606, the positioning shaft 602 of the bracket 600 is fitted in the positioning groove 610 in the frame, so that the thermal head 60 and platen 61 can be regulated in terms of their positions.

Thus, the attachment or detachment of the thermal head 60 to or from the associated bracket 600 is easily achievable by providing the positioning groove 609 in the hanger 608 and engaging or disengaging the pin 603 and sheet spring 604 of the bracket 600 within or from that groove 609.

Further, the printing line of the thermal head 60 and the platen 61 can be regulated in terms of their positions by engaging the positioning shaft 602 of the bracket 600 within the positioning groove 610 in the frame.

Still further, the line thermal head 60 is designed to be rotatable around the positioning groove 610 in the hanger 608 in the line direction, thus enabling printing pressure and density to be made uniform in the horizontal direction.

In addition, the printer unit can be achieved simply and inexpensively, because the mechanism for attachment or detachment of the thermal head 60 is made integral with the mechanism for making density uniform.

How to ticket will be explained chiefly with reference to FIGS. 6 and 7.

In the pre-feeder unit 4, the continuous paper 1 held in the ticket blank holders 3*a* and 3*b* is first cut, biased and put in a ready-for-further-feeding state.

Upon receiving a ticketing command, the pre-feeder unit 4 is actuated to feed each cut ticket blank 1*a* to the MS unit 5 where it is biased and data is magnetically recorded on its magnetic stripe 11 and then it is fed to the printer unit 6.

In the printer unit 6, the data is thermally recorded by the thermal head 60 on the ticket blanks 1*a* with their leading ends in order, and they are then ejected into the ejection port 23 or the hopper 22.

Following the feed of the cut ticket blanks 1*a* by the pre-feeder unit 4, the next continuous paper 1 may be fed, positioned and separated by cutting into individual ticket blanks 1*a* for making ready-to-feed. In other words, the next cut ticket blanks 1*a* are made for ready-for-further-feeding while the preceding cut ticket blanks 1*a* are magnetically recorded and thermally printed, thus improving the issuance speed of tickets.

The ticket blank holders 3*a* and 3*b* hold airline ticket blanks in the form of continuous paper, and so the management of the securities can not only be easily achieved, but something wrong can immediately be found as well. In addition, the continuous paper is separated by cutting into individual ticket blanks 1*a*, and so not only is it assured that they are magnetically recorded and thermally printed, but there is also no need of separating the continuous paper into individual ticket blanks after ejection.

While the instant embodiment has been described with reference to airline tickets, it is understood that the invention is applicable to other securities or tickets such as passenger or reservation tickets.

Next, another embodiment of the pre-feeder unit 4 will be explained with reference to FIGS. 21, 22A and 22B.

Figure 21A:
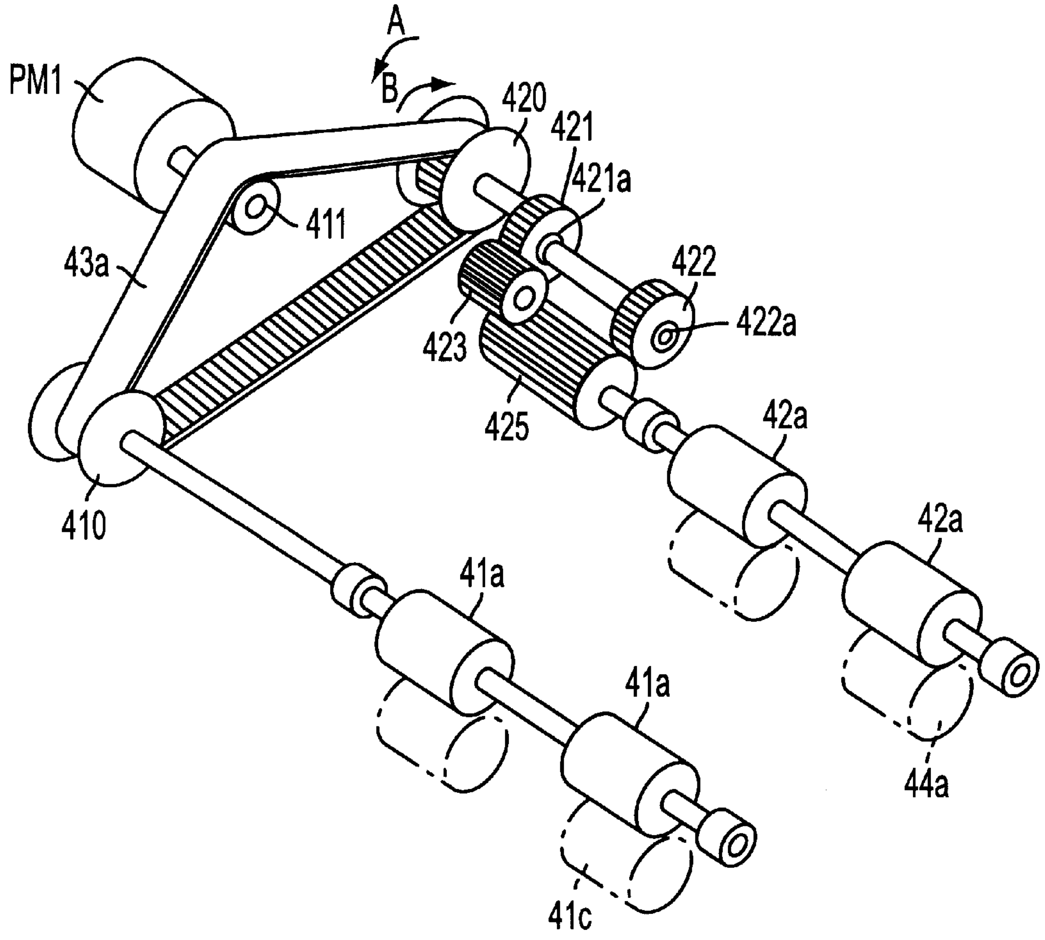
FIGS. 21A and 21B are diagrams showing another embodiment of the pre-feeder unit.
Figure 21B:
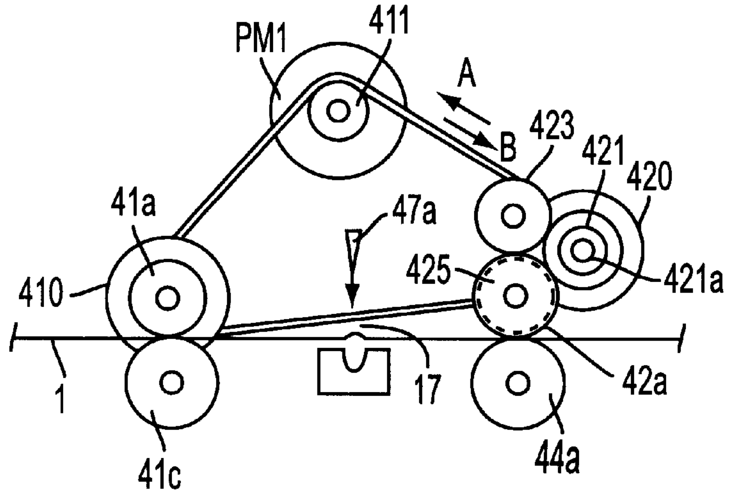
Figure 22A:
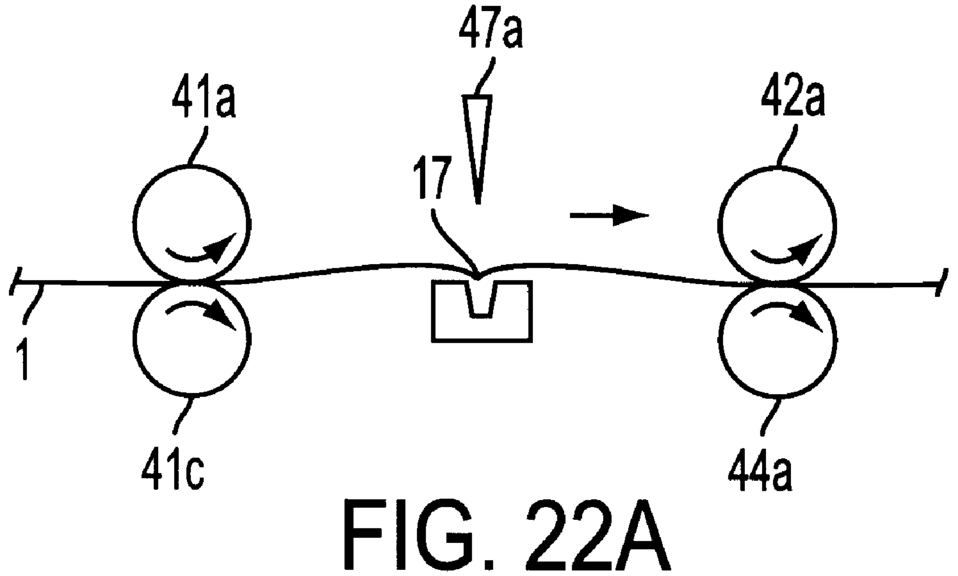
FIGS. 22A and 22B are diagrams of how the pre-feeder unit of FIG. 21 works.
Figure 22B:
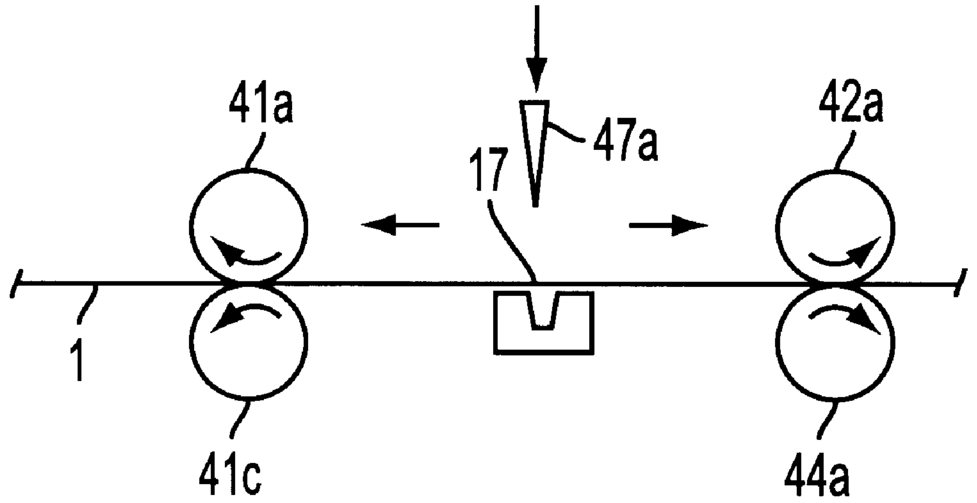

As shown in FIGS. 21(*a*) and 21(*b*) that are the perspective and side views of such an embodiment, a gear 425 is coaxially fixed to a shaft of a feed roller 42*a*, which in turn meshes with a gear 423. The gears 425 and 423 are respectively in mesh with gears 421 and 422 that are mounted on their driving shaft through one-way clutches 421*a* and 422*a*, respectively. The driving shaft is provided at its one end with a toothed pulley 420. It is noted that pulleys 410, 411 and 420 are connected with one another by a belt 43*a*.

The one-way clutches 421*a* and 422*a* are mounted such that the gears 421 and 422 are each rotated in the opposite direction. To put it another way, when the pulley 420 is rotated in the direction shown by an arrow A, the one-way clutch 422*a* disengages the gear 422 to keep it idle, while the one-way clutch 421*a* is actuated to rotate the gear 421 and thereby rotate the gear 425 through the gear 423, so that the feed rollers 420 can be rotated in the feed direction of the continuous paper 1.

When the pulley 420 is rotated in the direction shown by an arrow B, on the other hand, the one-way clutch 421*a* disengages the gear 421 to keep it idle, while the one-way clutch 422*a* is actuated to rotate the gear 422 and then the gear 425, so that the feed roller 42*a* can again be rotated in the feed direction of the continuous paper 1.

According to the pre-feeder unit 4 of the construction mentioned above, the continuous paper 1 fed from the ticket blank holder 3*a* is fed in the feed direction by the forward rotation, i.e., rotation shown by the arrow A, of the motor PM1, because the pulleys 410 and 420 are then rotated in the direction shown by the arrow B to rotate the feed rollers 41*a* and 42*a* in the same direction.

With the continuous paper 1 fed to a predetermined position, the motor PM1 stops, and then rotates in the opposite direction, i.e., the direction shown by the arrow B in FIG. 21. Thereupon, the pulleys 410 and 420 are rotated in the direction shown by the arrow B and, as illustrated in FIG. 22(B), this then causes the rotation of the feed roller 41*a* in the opposite direction and the rotation of the feed roller 42*a* in the forward direction.

Consequently, the continuous paper 1 is pulled and tensioned regardless of the presence or absence of looseness, because the feed rollers 41*a* and 42*a* are each rotated in the opposite direction.

Then, the continuous paper 1 is cut along the perforations 17 into individual ticket blanks 1*a* by the cutter 47*a*.

The tickets 1*a* are then carried by driving the feed rollers 41*a* and 42*a* to the MS read-write unit 5.

Figure 23:
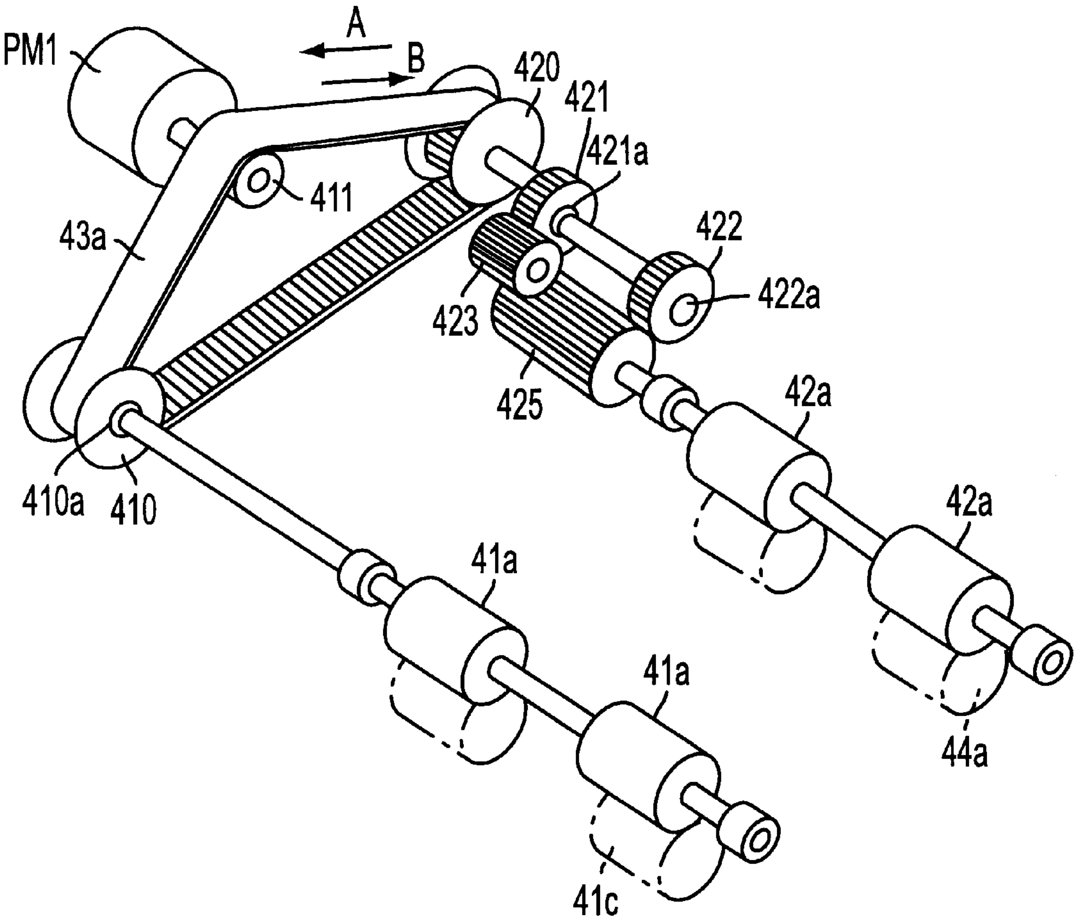
FIG. 23 is a diagram that illustrates the construction of a further embodiment of the pre-feeder unit.
Figure 24A:
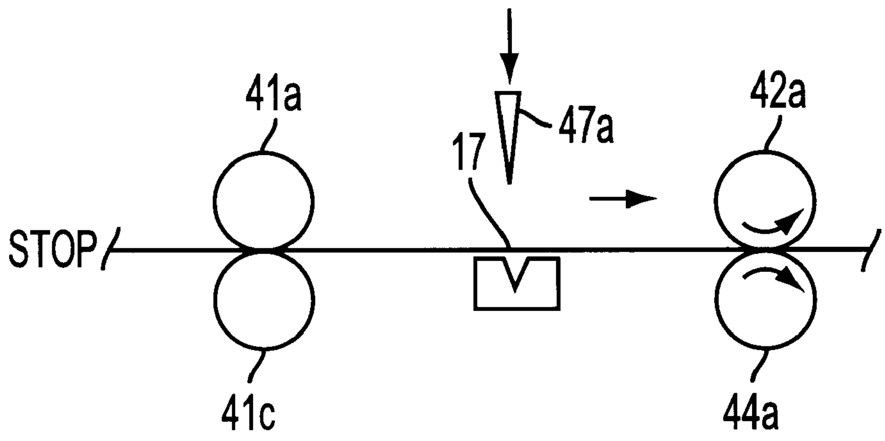
FIG. 24A and 24B are diagrams of how the pre-feeder unit of FIG. 23 works.
Figure 24B:
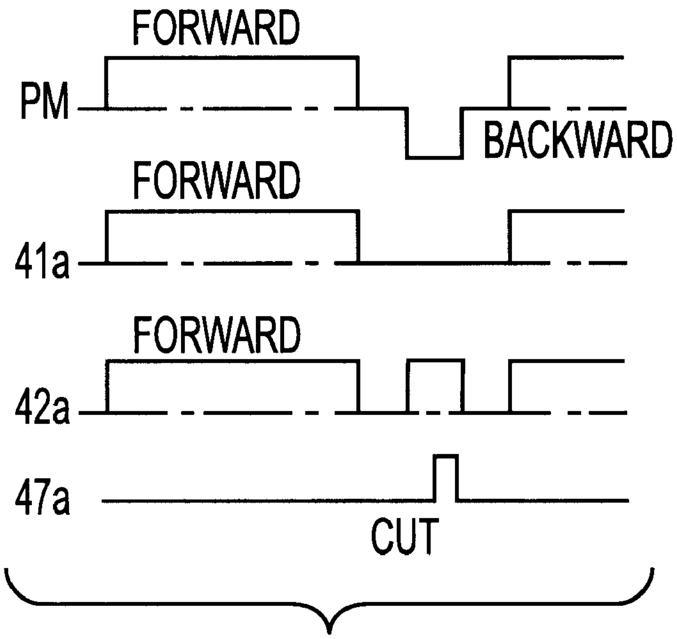

In the ensuing description, a further embodiment of the pre-feeder unit 4 will now be explained with reference to. FIGS. 23, 24A and 24B.

The construction shown in FIG. 23 follows that of the embodiment illustrated with reference to FIG. 21, with the exception that when the motor PM1 is rotated in the opposite direction (the direction shown by an arrow B), the feed roller 41*c* is caused to stop rather than rotate in the opposite direction. According to the embodiment shown in FIG. 21, when the feed roller 41*c* is rotated in the opposite direction, the continuous paper 1 is cut, but the rest of the continuous paper 1 may be fed back in that moment. The instant embodiment is provided to avoid this.

More specifically, the axis of the feed roller 41*c* is provided at its one end with a toothed pulley 410 through a one-way clutch 410*a*, as illustrated in FIG. 23. Consequently, it is when the motor PM1 is driven in the forward direction (or in the direction shown by an arrow A) that the one-way clutch 410*a* is so actuated that the feed roller 41*c* can rotate in the forward direction (or in the direction A). In contrast, it is when the motor PM1 is driven in the opposite direction (or in the direction shown by an arrow B) that the one-way clutch 410*a* disengages the pulley 410, so that it can be kept idle, thereby keeping the feed roller 41*c* from rotation.

When the motor PM1 is driven in the opposite direction (or in the direction B), the feed roller 42*a* is rotated in the feed direction, but the feed roller 41*a* is not rotated by the rotational force of the pulley 410. Consequently, a sag in the continuous paper 1 is temporarily pulled, and so tension is imparted to the continuous paper 1. Subsequently, the continuous paper is fed by the feed roller 42*a* under that tension, so that, as shown in the time chart presented in the form of FIG. 24(B), the continuous paper 1 can be cut along the perforation 17 by the cutter 47*a* at a timing at which that sag is pulled by the feed roller 41*a* just after the backward driving of the motor PM1.

The feed roller 41*a* is then not rotated, and so the feeding-back of the rest of the continuous paper 1 is avoided, thus enabling the distance to the next cutting position to be reduced. The time reduction achieved per ticket is slight, but the total ticketing time can be much reduced in the case of issuing a large number of tickets sequentially.

How to regulate the position of the MS unit 5 at which data recording is initiated is described below.

Figure 25A:
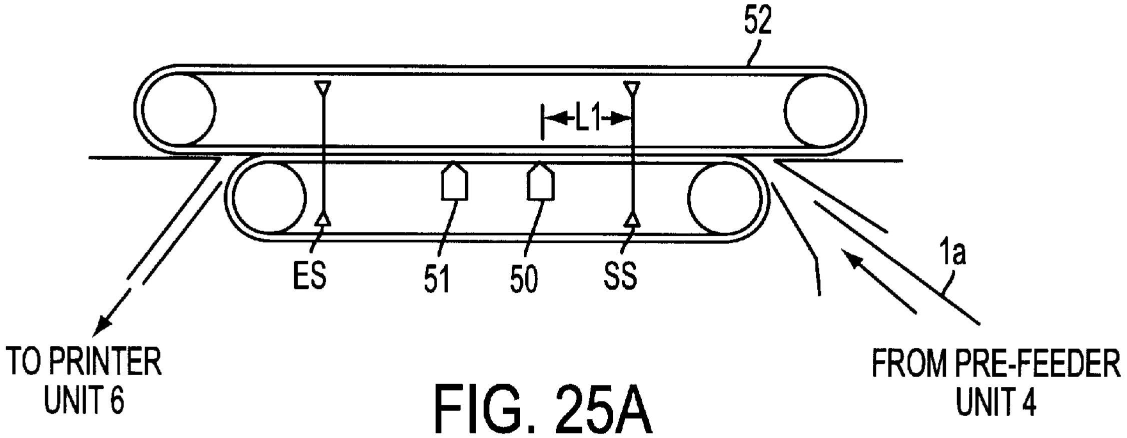
FIG. 25A and 25B are diagrams of how the MS unit of FIG. 16 starts to write.

As shown in FIG. 25(A), the main part of the MS unit 5 is built up of a sensor SS for sensing the leading end of each ticket blank 1*a*, a write head 50 disposed in the rear of the sensor SS by a predetermined distance LI, a read head 51 located in rear of the write head 50 and a sensor ES located in rear of the read head 51 for sensing the trailing end of each ticket blank 1*a*.

Figure 25B:
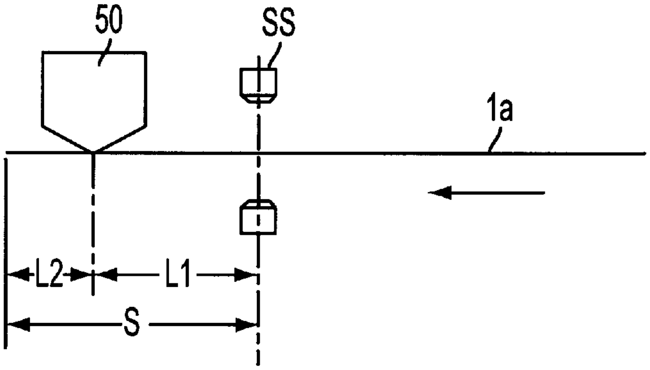

With each ticket blank 1*a*—that has been fed from the ticket blank holder 2*a* and is now ready to leave in the pre-feeder unit 4—fed out of the pre-feeder unit 4 as per ticketing instructions, it is fed by the belt mechanism 52 to the passage for the MS unit 5. When the ticket blank 1*a* is carried to a given position through a predetermined distance S after its leading end has been sensed by the sensor SS, as shown in FIG. 25(B), boarding reservation data (departure date and time, flight number, passenger's name, and so on) sent out of external equipment is magnetically recorded by the write head 50 on the magnetic stripe 11 of the ticket blank 1*a*.

The data recorded on the magnetic stripe 11 of the ticket blank 1*a* is reproduced by the read head 51 for checkup. If there is no error, the ticket blank 1*a* is fed to the printer unit 6 where the data is printed and then it is sent out of the issuance port. Then, when the printing is ended, the completion of ticketing is notified. This enables the succeeding ticket 1*a* to be ready to leave the pre-feeder unit 4.

It is to be noted that the position of a predetermined distance S taken by the ticket blank 1*a* after its leading end has been detected lies at the position of a distance L2 from the leading end of the magnetic stripe 11 to the write head 50 (i.e., L2=S−L1), and this distance L2 must lie within a certain tolerable range with respect to a predetermined size.

In other words, the writing of the data onto the magnetic stripe by the write head 50 is initiated after the lapse of a time period t from the detection of the leading end of the ticket 1*a* by the sensor SS to the time at which the leading end of the ticket blank 1*a* would reach the position of the distance S.

When the distance L2 is too short, reading is unlikely to occur because some difficulty is involved in the synchronization of the read signals, whereas when it is too long, some data are unlikely to be recorded because the recording zone of the magnetic stripe 11 becomes narrow. For assuring stable reading and recording region, there are thus the ISO and JIS standards (e.g., 7.44 Mmm±1.0 mm).

However, the given distance S depends on the accuracy of the spacing between the sensor SS and the write head 50 and, besides, there is an error in the accuracy of mechanical feeding by the belt mechanism 52, which in turn gives rise to an error in the distance L2. For this reason, after data is actually recorded on the ticket blank 1*a*, the recording initiation position from the leading end of the magnetic strip of the ticket 1*a* is measured to regulate the quantity of the error alone. So far, this regulation has been achieved by the following procedures.

The first procedure, as already mentioned above, involves recording data on the magnetic stripe 11 of the ticket 1*a* and visualizing the magnetic pattern with the use of a developer to measure the distance L2 to the write start position on the ticket blank 1*a* under a scaled magnifier. In the process of this development, the magnetic stripe 11 is treated with a developer composed of a mixture of a volatile liquid with magnetic powders. Then, the volatile component volatilizes, leaving the magnetic powders on the data part.

When the results of this measurement teach that the error deviates from the prescribed value, the relative distance between the sensor SS and the write head 50 is adjusted by changing the position at which the sensor SS is mounted, again, followed by magnetic recording and development to measure the recording start location. In other words, the first procedure is a method of trial and error.

The first procedure may be achieved by a mere displacement of the position of the sensor SS but, in this case, it is sometimes required to provide some mechanism for the fine adjustment of the location of the sensor SS.

A second procedure that is similar to the first procedure in that data is recorded on the magnetic stripe 11 of the ticket blank 1*a* and then developed. The distance of movement of the ticket blank 1*a* is from the time when the sensor SS detects the leading end of the ticket 1*a* to the recording start time.

To be more specific, an encoder, (not illustrated), is provided on the driving pulley of the belt mechanism 52 for feeding the ticket 1*a*. Then, the distance of movement of the ticket 1*a* is calculated. It is when the sensor SS reaches a given calculated value t after detecting the leading end of the ticket blank 1*a* that the write head 50 starts to record.

This is followed by development and measurement. The recording start position, when there is an error, is regulated by increasing or decreasing this calculated (or set) value.

It is noted that the second procedure may also be achieved by using a stepping motor for driving the driving pulley in place of the encoder, but there is a need of increasing or decreasing the stepping number of the motor.

A problem with the above-mentioned conventional procedures, however, is that they are all time and labor consuming, because of involving the steps of development, measurement and regulation after the recording of data on the magnetic stripe of a ticket blank.

According to the instant embodiment, this problem is solved by making it possible to automatically regulate the recording start position on a ticket blank by the mere insertion of the ticket blank.

Figure 26:
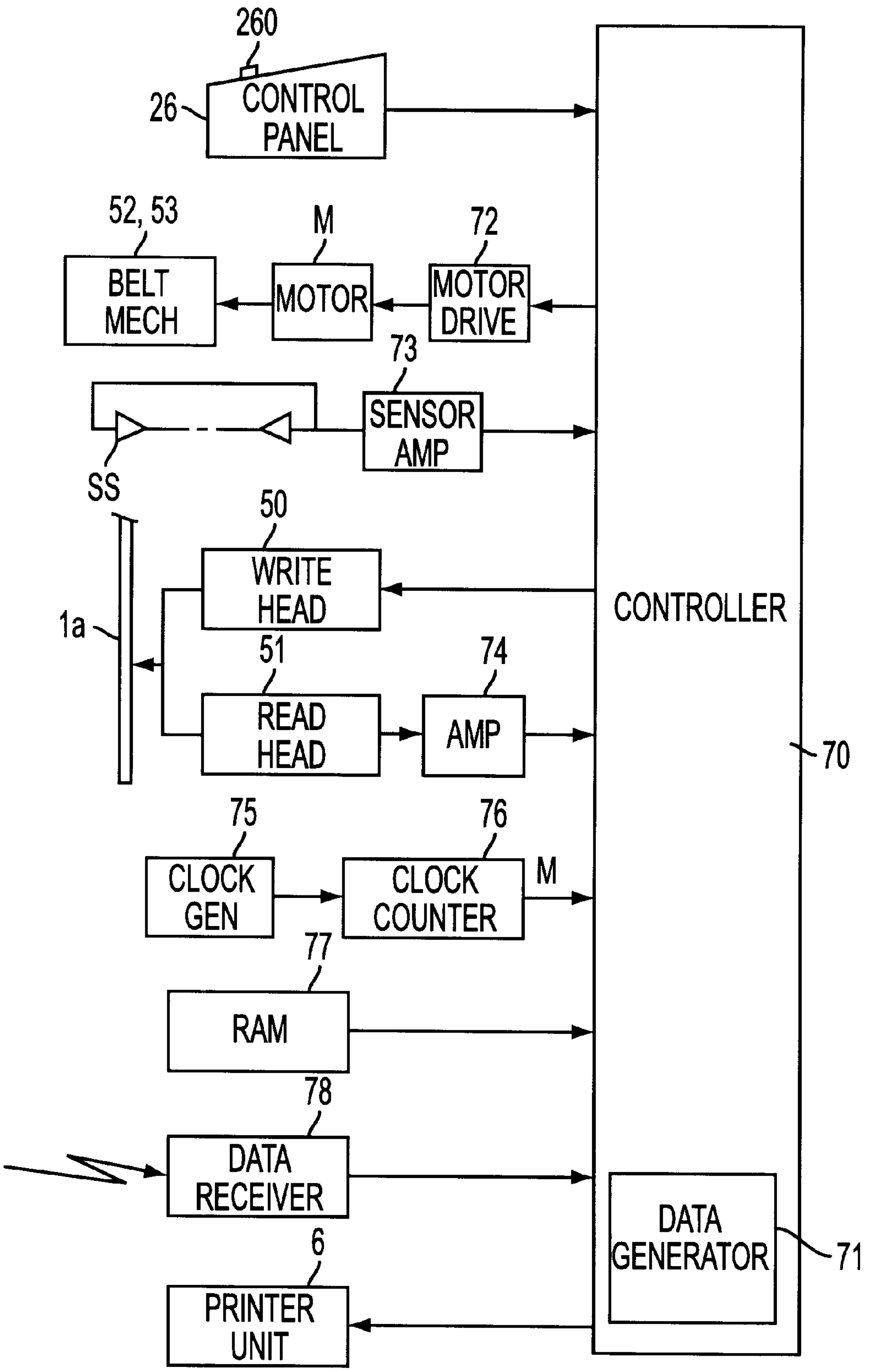
FIG. 26 is a block diagram that provides an illustration of how the write start position of the MS unit of FIG. 16 is corrected.

FIG. 26 is a block diagram presented for achieving this. In FIG. 26, a control panel 26 is similar to that shown in FIGS. 4 and 5, and includes a correction-mode indicating button 260 for setting the mode for determining a correction value for the recording start position on a ticket 1*a*. A clock generator 76 generates a clock signal of a frequency F.

Figure 29A:
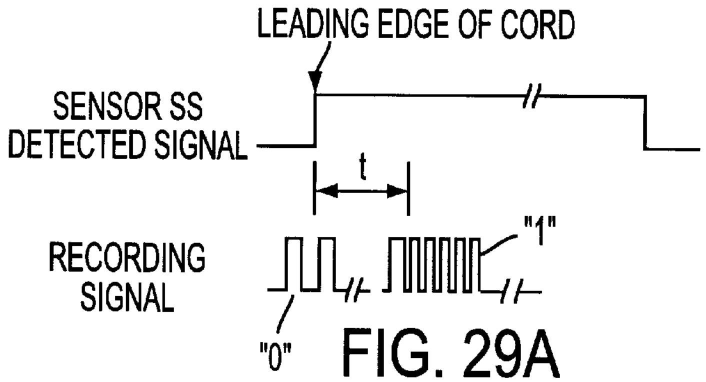
FIGS. 29A–29C are timing diagrams of how the block of FIG. 27 works.
Figure 29B:
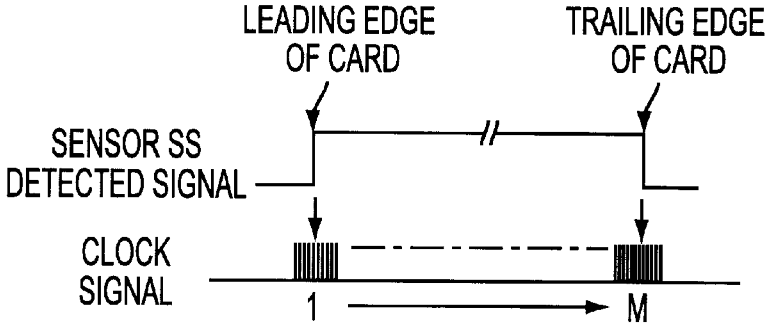
Figure 29C:
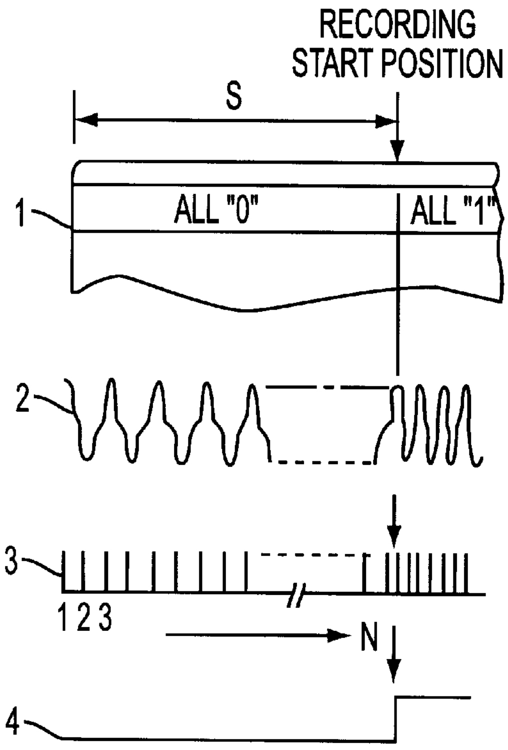

A clock counter 76, when the correction-mode indicating button 260 is pushed down, is actuated to count the number of all clock signals M sent out of the clock generator 75 from the time a sensor SS detects the leading end of the ticket 1*a* to the time the sensor SS detects the trailing end of the ticket 1*a*. FIG. 29(*b*) represents the timings of the sensor-detected signal and the clock signals, and counts the time during which the ticket 1*a* of accurate size passes by the sensor SS by the clock signals of frequency F. This is to measure the feed speed accurately.

A RAM 77 stores the value of the frequency F of the clock signals set out of the clock generator 75 and a recording frequency F of data “0” generated from a data generator block 71 at a correction mode to be described later. A data reception block 78 receives the data to be recorded, which is sent out of an external device.

A main control block 70 includes a CPU and a control program memory, and the CPU controls each block according to the control program in the memory, feeding a ticket blank 1*a*, making a given record on the magnetic stripe 11 of the ticket blank 1*a*, reproducing the record for checkup, and printing data on the ticket blank 1*a* for ejection.

Figure 27:
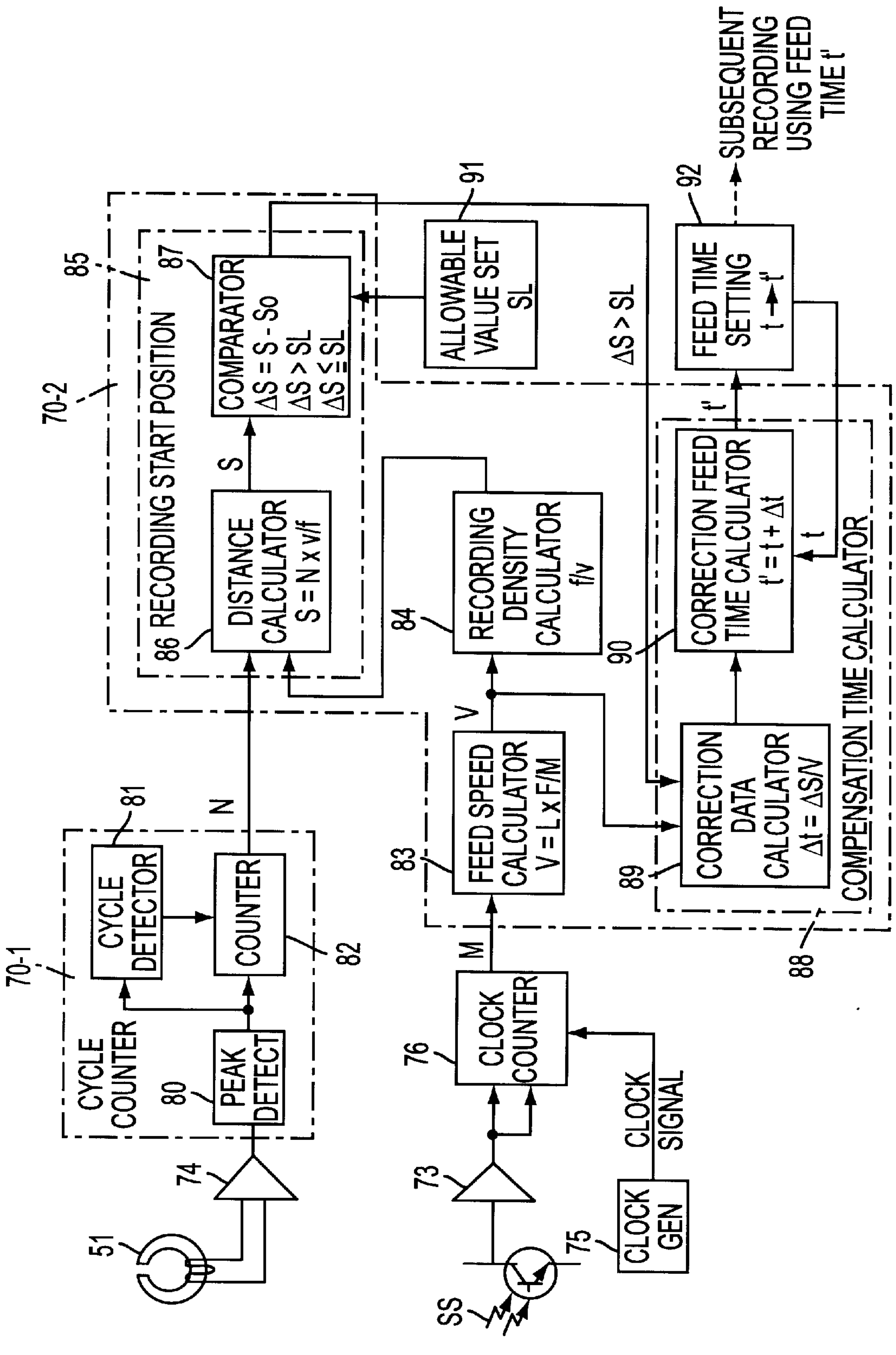
FIG. 27 is a block diagram that illustrates the function of a main controller unit shown in FIG. 26.

Further, the CPU, when the correction-mode indicating button 260 is pushed down, is actuated to detect an error in the recording start position by a series of controls shown in FIG. 27, and thereby executes the automatic correction of the recording start position.

Reference numeral 72 stands for a motor driver that drives a motor M upon receipt of instructions from CPU 70 to drive feeding belts 52 and 53. Reference numeral 73 denotes a sensor amplifier that amplifies the output of the sensor SS for output to the CPU in the main control block 70, and 74 represents an amplifier that amplifies the output of a reproduction head 51 for output to the CPU in the main control block 70.

FIG. 27 represents the functions of the CPU in the main control block 70 of FIG. 26 in block form, and the functions of the main control block 70 will now be explained with reference thereto.

In FIG. 27, a cycle counter block 70-1 is constructed from a peak detector sub-block 80, a cycle detector sub-block 81 and a counter 82, and a calculator block 70-2 is built up of a feed speed calculator sub-block 83, a recording density calculator sub-block 84, a recording start position calculator sub-block 85 and a correction time calculator sub-block 88. In what follows, the function of each block will be explained.

A feed time setting block 92 is made up of a memory, and initially set with a theoretical write start time t until the leading end of a ticket blank 1*a* is detected to start recording data, wherein t=SN, where S is the recording start position (to be described later) and is the feed speed. However, this preset t, when the correction time Δt to be described later is found, is replaced by a correction time t'(=t+Δt).

A block 71 (see FIG. 26) for generating data at the correction-mode time stores data "0" and "1" and, when the correction mode is indicated by pushing down the correction-mode indicating button 260, is actuated to generate the data "0" that is recorded from the time the sensor SS detects the leading end of a ticket blank 1*a* to the the data-recording start time (i.e., the feeding time t of the ticket blank 1*a*) and the data "1" that is recorded from the data-recording start time. FIG. 29(*a*) represents the timings of the sensor-detected signals and the recording signals. It is noted that the magnetic inversion cycles of the data "0" and "1" lie at a ratio of 2 to 1, and that the magnetic inversion cycle of the data "0" or the recording frequency is f.

In the cycle counter block 70-1, the peak of the output signal corresponding to the magnetic inversion of the data read on the read head 51 is detected by the peak detector sub-block 80 from the leading end of the ticket blank 1*a* having the data "0" and "1" recorded thereon, as shown in FIG. 29(*c*)(1), and the number of all cycles N until the changing of the data from "0" to "1" is detected is counted by the counter 82, as shown in FIGS. 29(*c*)(2) and 29 (*c*)(3).

In other words, the counter 82 counts the changing cycle of the data from "0" to "1" in terms of the number of all cycles detected by the cycle detector sub-block 81. FIG. 29(*c*)(4) represents a signal detecting that the peak signal cycle is reduced because of the changing of the data from "0" to "1".

In the feed speed calculator sub-block 83, an actual feed speed V given by LF/M is found, wherein F is the clock frequency read from RAM 77, M is all the clock signals counted by the clock counter and L is the length of the ticket blank 1*a*.

In the recording density calculator sub-block 84, a recording density given by f/v is found, wherein f is the recording frequency read from RAM 77 and V is the actual feed speed.

The recording start position calculator block 85 is built up of a distance calculator 86 and a comparator 87. In the distance calculator 86, a distance S from the sensor SS to the recording start position given by NV/F is found, wherein N is the total cycle number N counted by the cycle calculator block 70-1 and f/V is the recording density calculated by the recording density calculator sub-block 84. In the comparator 87, the absolute value ΔS of a difference between the measured distance S and a preset distance $S_0$ to the recording start position is found and compared with a prescribed value $S_L$ for an allowable tolerance limit set in an allowable-value setting block 91 to determine of $\Delta S>S_L$ or $\Delta S\leqq S_L$. When $\Delta S>S_l$, the main control block 71 is notified of the "need" for correcting the recording start position, and when $\Delta\leqq S_L$, the main control block 71 is notified of the "no need" for correcting the recording start position.

The correction time calculator block 88 includes a correction data calculator 89 and a correction feed time calculator 90. The correction data calculator 89, when there is the "need" for correcting the recording start position, calculates the correction time Δt given by ΔS/V, where ΔS is the difference found by the comparator 87 and V is the feed speed, according to instructions from the main control block 71. With the correction time Δt found, the correction time feed time calculator block 90 is actuated to correct the feed (write start) time t that is initially set in the feed time setting block 92 with the correction time Δt. That is, the correction feed time t'=t±Δt is calculated.

Figure 28:
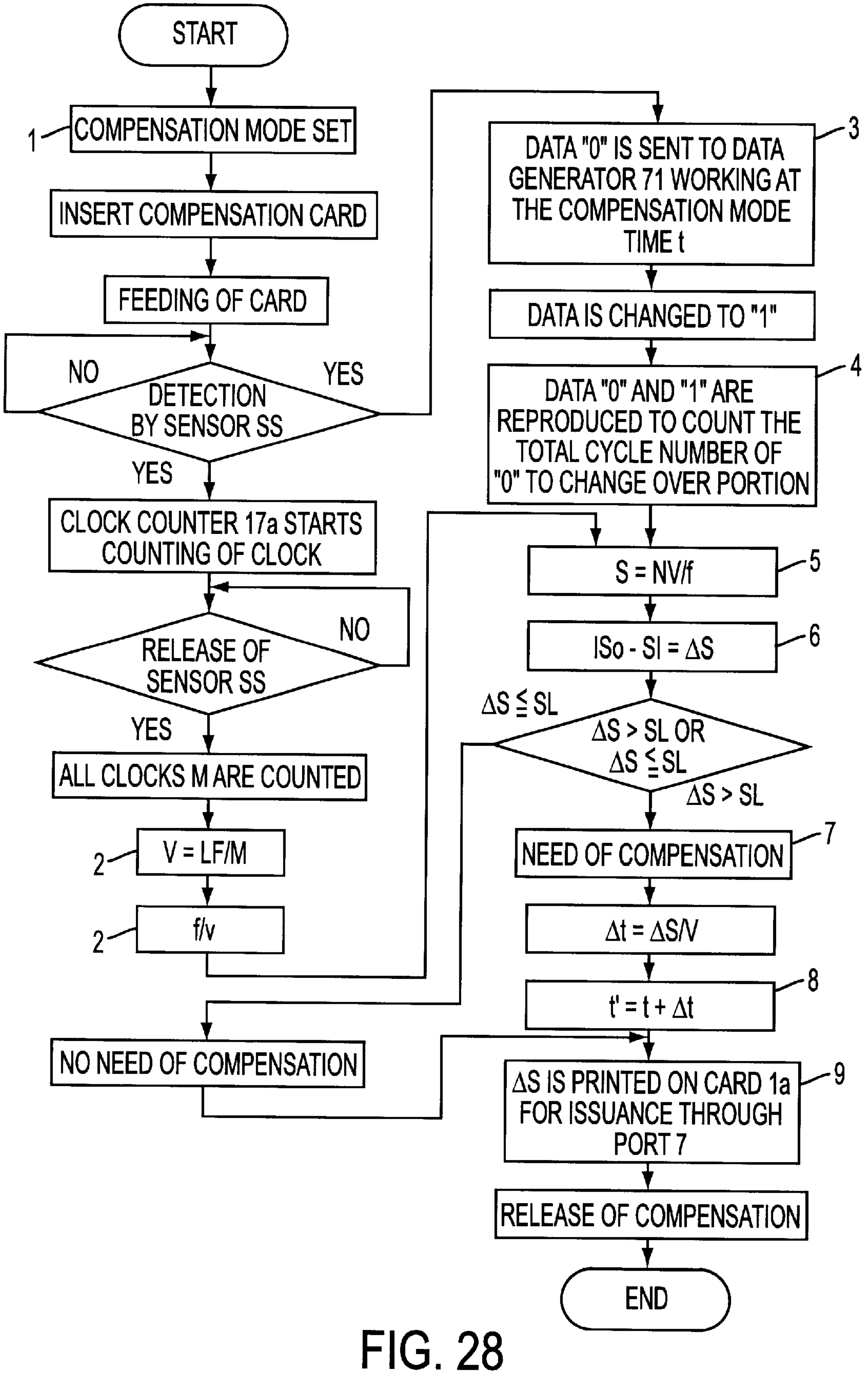
FIG. 28 is a flow chart for correcting the write start position of the MS unit of FIG. 16.

In the ensuing description, the operation of the instant embodiment will be explained with reference to the flow chart of FIG. 28.

(1) First, the power source of the apparatus is turned on and the correction-mode indicating button 260 is pressed down to set the correction mode.

Then, a ticket blank 1*a* (of accurate length L) for testing purposes is inserted through the inserting port 21, shown in FIGS. 4 and 5, and whence it is fed through the MS unit 5 to the unit 5*c* where the manually inserted ticket blank stands for further feeding, as is the case with the manually inserted ticket blank. From this unit 5*c*, it is fed to the MS read-write unit 5*a*. When the leading end of the ticket blank 1*a* is here detected by the sensor SS, the clock counter 76 is triggered to count the number of all clock signals (having frequency F) generated until the sensor SS detects the trailing end of the ticket blank 1*a*. Then, the accurate actual feed speed V is found in the feed speed calculator block 83 from the length L of the ticket blank 1*a* and the total clock signals M; in other words, it is calculated from V=L×F/M.

(2) Further, the recording density f/V is found in the recording density calculator block 84 by dividing the recording frequency f read from RAM 77 by the feed speed V.

(3) From the time the sensor SS detects the leading end of the ticket blank 1*a*, on the other hand, recording is made with the use of the feed (write start) time t initially set in the feed time setting block 92. Before the recording start time t, the main control block 70 continuously output the data "0" from a data generation unit 71 that works at the correction value-determining time for recording them on the magnetic stripe 11 of the ticket blank 1*a* by the write head 50. After the recording start time t, the data is changed to "1" for recording.

(4) Now, the data "0" is read by the read head 51 from the leading end of the fed ticket blank 1*a*, and the counter 82 counts the total cycle number N until the cycle detector subblock 81 detects that the data is changed from "0" to "1".

(5) The counted total cycle number N and the recording density f/V calculated at Step (2) are fed to the recording start position calculator block 85, where the distance S to the recording start position is found by the distance calculator 86; in other words, the distance is calculated from S=N×V/f.

(6) In the comparator 87, the absolute value ΔS ($=S-S_0$) of the difference between the distance S and the preset distance $S_0$ to the recording start position is found and compared with the prescribed value $S_L$ in the allowable value setting block 91 to provide determination of $\Delta S>S_L$ or $\Delta S\leqq S_L$, notifying the main control block 71 of the "need" or "no need" of correcting the distance S. When there is no need, no correction occurs. Hence, subsequent recording of the ticket blank 1A is done with the use of the write start time t that is initially set in the feed time setting unit 12.

(7) When there is the "need" of correcting the distance S, ΔS is divided by the feed speed V—that is found by in the feed speed calculator block 83—by the correction data calculator 89 in the correction time calculator block 88 to find the correction time Δt (=ΔS/V).

(8) Then, the intially set recording start time t is read from the feed time setting block 92, and the correction feed time t'=t+Δt is found in the correction feed time calculator 90 by the correction time Δt. The correction feed time t" is then renewed in the feed time setting block 92 in place of the initially set feed time t.

(9) After that, the ticket blank 1*a* is fed to the printer unit 6 where the correction value (i.e., ΔS) is printed for issuance through an issuance port. This enables the operator to confirm the quantity of regulation. Finally, the correction-mode indicating button 260 is again pressed down to release the correction mode, making the correction of the recording start position complete.

After the passing of the time t' from the time the sensor SS detects the leading end of the ticket blank 1*a*, the write head 50 starts to write the data with the use of the thus corrected write start time (feed time) t', whereby the data is written onto the ticket blank 1*a* from the position away from the leading end by the given distance L1. Such correction is usually done when hardware is forwarded from plants or in-situ replacement of the whole or a part of the MS unit 5.

Therefore, the instant embodiment can dispense with some post-data-recording steps of development, measurement and regulation that are required for conventional correction procedures, and so can eliminate troublesome development and measurement works and works for regulating the distances of the sensor SS and write head 50 for correcting the recording start position on the ticket blank 1*a*.

While the instant embodiment has been described as making correction only when the difference ΔS, when found, exceeds the allowable value $S_L$, it is understood that only the feed time Δt corresponding to the difference ΔS may be corrected irrespective of the allowable value $S_L$.

As many apparently widely different embodiments of the present invention can be made without departing from the spirit and scope thereof, it is to be understood that the invention is not limited to the specific embodiments thereof except as defined in the appended claims.

What we claim is:

1. A ticket printer for magnetically recording and printing ticket data on a ticket blank for issuance, comprising:

ticket blank holder means for holding a continuous form of medium having perforations that can be separated along said perforations into an individual ticket blank;

pre-feeder means for feeding said continuous form of medium from said ticket blank holder means, pre-cutting said medium along said perforations into the individual ticket blank, holding said pre-cut ticket blank and feeding said held ticket blank responsive to instruction;

magnetic recording means for magnetically recording ticket data on a magnetic recording layer of the fed ticket blank;

printing means for printing the ticket data on each magnetically recorded ticket blank for issuance; and control means for controlling said pre-feeder means so as to feed said held ticket blank to said magnetic recording means and to pre-cut said medium into a next ticket blank.

2. A ticket printer as recited in claim 1, wherein said continuous form of medium is provided with cutouts on both sides of each perforation for separating said medium into individual ticket blanks.

3. A ticket printer as recited in claim 1, wherein the ticket blank holder means is located in a lower portion of the apparatus body and the magnetic recording means and said printing means are located in an upper portion of the apparatus body, so that the ticket blanks can be fed by said pre-feeder means from said ticket blank holder means to a rear part of said magnetic recording means located in the upper portion of the apparatus body.

4. A ticket printer as recited in claim 1, wherein said pre-feeder means is designed to feed said continuous form of medium until each perforation in said medium is located at a cutter position, said medium being cut by a cutter.

5. A ticket printer as recited in claim 4, wherein said pre-feeder means is designed to apply tension to said continuous form of medium, when cut, thereby pulling said medium on both sides of each perforation.

6. A ticket printer as recited in claim 5, wherein said pre-feeder means is provided with a biasing mechanism for biasing cut ticket blanks.

7. A ticket printer as recited in claim 4, wherein said pre-feeder means is provided with a biasing mechanism for biasing cut ticket blanks.

8. A ticket printer as recited in claim 1, wherein said magnetic recording means includes a biasing mechanism that, while cut ticket blanks are fed by a belt, biases the fed ticket blanks in a widthwise direction.

9. A ticket printer as recited in claim 1, wherein said printing means includes a printing mechanism for putting leading ends of magnetically recorded ticket blanks in order and then printing said ticket blanks.

10. A ticket printer as recited in claim 1, wherein said ticket to be issued is an airline ticket.

11. A ticket printer for magnetically recording and printing ticket data on ticket blanks for issuance, comprising:

ticket blank holder means for holding a continuous form of medium having perforations that can be separated along said perforations into individual ticket blanks;

pre-feeder means for feeding said continuous form of medium from said ticket blank holder means, cutting said continuous form of medium along the perforation into said individual ticket blanks and feeding said individual ticket blanks to said magnetic recording means, said pre-feeder means comprises:

a pair of feed rollers for feeding said continuous form of medium and said individual ticket blanks;

a cutter provided between said pair of feed rollers, for cutting said continuous form of medium along the perforation into said individual ticket blanks; and driving means for forwardly driving said pair of feed rollers when said continuous form of medium is fed and forwardly driving one of said pair of feed rollers and holding the other one of said pair of feed rollers when said continuous form of medium is cut, thereby pulling said medium on both sides of each perforation;

magnetic recording means for magnetically recording ticket data on a magnetic layer of said individual ticket blanks; and printing means for printing ticket data on each magnetically recorded ticket blank for issuance.

12. A ticket printer for magnetically recording and printing ticket data on ticket blanks for issuance, comprising:

ticket blank holder means for holding a continuous form of medium having perforations that can be separated along said perforations into individual ticket blanks;

pre-feeder means for feeding said continuous form of medium from said ticket blank holder means, cutting said continuous form of medium along the perforation into said individual ticket blanks and feeding said individual ticket blanks to said magnetic recording means, said pre-feeder means comprises:

a pair of feed rollers for feeding said continuous form of medium and said individual ticket blanks;

a cutter provided between said pair of feed rollers, for cutting said continuous form of medium along the perforation into said individual ticket blanks; and driving means for forwardly driving said pair of feed rollers when said continuous form of medium is fed and forwardly driving one of said pair of feed rollers and reversely driving the other one of said pair of feed rollers when said continuous form of medium is cut, thereby pulling said medium on both sides of each perforation;

magnetic recording means for magnetically recording ticket data on a magnetic layer of said individual ticket blanks; and printing means for printing ticket data on each magnetically recorded ticket blank for issuance and wherein said driving means comprises;

a single drive motor for forwardly and reversely rotating said the other one of said pair of feed roller; and one-way clutch for transfer said rotating force of said drive motor to said one of said pair of feed rollers.

* * * * *